US012651256B2

(12) United States Patent
Guo et al.

(10) Patent No.: US 12,651,256 B2
(45) Date of Patent: Jun. 9, 2026

(54) ASSET TRANSACTION METHOD, STORAGE MEDIUM, AND COMPUTER DEVICE

(71) Applicant: TENCENT TECHNOLOGY (SHENZEN) COMPANY LIMITED, Shenzhen (CN)

(72) Inventors: Rui Guo, Shenzhen (CN); Maocai Li, Shenzhen (CN); Zongyou Wang, Shenzhen (CN); Haitao Tu, Shenzhen (CN); Li Kong, Shenzhen (CN); Kaiban Zhou, Shenzhen (CN); Changqing Yang, Shenzhen (CN); Nan Wang, Shenzhen (CN); Yong Ding, Shenzhen (CN); Yifang Shi, Shenzhen (CN)

(73) Assignee: TENCENT TECHNOLOGY (SHENZEN) COMPANY LIMITED, Shenzhen (CN)

( * ) Notice: Subject to any disclaimer, the term of this patent is extended or adjusted under 35 U.S.C. 154(b) by 686 days.

(21) Appl. No.: 17/068,950

(22) Filed: Oct. 13, 2020

(65) Prior Publication Data

US 2021/0027289 A1 Jan. 28, 2021

Related U.S. Application Data

(63) Continuation of application No. PCT/CN2019/108412, filed on Sep. 27, 2019.

(30) Foreign Application Priority Data

Sep. 29, 2018 (CN) .......................... 201811145446.8

(51) Int. Cl.
*G06Q 20/38* (2012.01)
*G06F 16/27* (2019.01)

(52) U.S. Cl.
CPC ........... *G06Q 20/389* (2013.01); *G06F 16/27* (2019.01); *G06Q 20/381* (2013.01);
(Continued)

(58) Field of Classification Search
CPC ............... G06Q 20/389; G06Q 20/381; G06Q 20/3825; G06Q 20/3829; G06Q 2220/00; G06F 16/27
See application file for complete search history.

(56) References Cited

U.S. PATENT DOCUMENTS 5,832,487 A * 11/1998 Olds ....................... G06F 16/27
10,826,685 B1 * 11/2020 Campagna ............ H04L 9/3247
(Continued)

FOREIGN PATENT DOCUMENTS

CN 105956923 9/2016
CN 105976246 9/2016
(Continued)

OTHER PUBLICATIONS

Andreas M. Antonopoulos, Mastering Bitcoin, Dec. 2014, O'Reilly Media (Year: 2014).*
(Continued)

*Primary Examiner* — Nilesh B Khatri
(74) *Attorney, Agent, or Firm* — ArentFox Schiff LLP

(57) ABSTRACT

In a transaction method, transaction information is obtained. The transaction information includes a type identifier and quantity of first assets, and a type identifier and quantity of second assets. Transaction records, corresponding to a transaction in a block, are stored upon verification of the transaction information. The transaction records include first and second transaction records. The first transaction record includes first input and output items corresponding to the first assets, and the first input and output items each includes the type identifier of the first assets. The second transaction (Continued)

record includes second input and output items corresponding to the second assets, and the second input and output items each includes the type identifier of the second assets. The block is broadcasted to other nodes in the blockchain network, and verification results are received. The block is added to a blockchain of a current node based on the verification results.

18 Claims, 12 Drawing Sheets

(52) U.S. Cl.
CPC ..... *G06Q 20/3825* (2013.01); *G06Q 20/3829* (2013.01); *G06Q 2220/00* (2013.01)

(56) References Cited

U.S. PATENT DOCUMENTS

| 11,164,165 | B1* | 11/2021 | Andreev | G06Q 20/02 |
| 11,481,761 | B2* | 10/2022 | Lam | H04L 9/14 |
| 11,930,100 | B2* | 3/2024 | Basu | H04L 9/0637 |
| 12,499,424 | B2* | 12/2025 | Wright | G06Q 20/065 |
| 2004/0236653 | A1* | 11/2004 | Sokolic | G06Q 40/00 |
| | | | | 707/E17.119 |
| 2009/0248574 | A1* | 10/2009 | Leung | G06Q 20/10 |
| | | | | 705/39 |
| 2013/0276053 | A1 | 10/2013 | Hugard, IV et al. | |
| 2015/0170112 | A1* | 6/2015 | DeCastro | G06Q 20/367 |
| | | | | 705/39 |
| 2015/0363769 | A1* | 12/2015 | Ronca | G06Q 20/381 |
| | | | | 705/64 |
| 2016/0330034 | A1* | 11/2016 | Back | G06Q 20/065 |
| 2018/0068130 | A1* | 3/2018 | Chan | G06F 21/606 |
| 2019/0012660 | A1* | 1/2019 | Masters | H04L 67/02 |
| 2019/0068365 | A1* | 2/2019 | Wright | H04L 9/0637 |
| 2019/0102758 | A1* | 4/2019 | Wright | H04L 9/50 |
| 2019/0220854 | A1* | 7/2019 | Pesci | G06Q 20/0658 |
| 2019/0287100 | A1* | 9/2019 | Song | G06Q 20/389 |
| 2019/0385156 | A1* | 12/2019 | Liu | H04L 63/10 |
| 2020/0098042 | A1* | 3/2020 | Hoshizuki | H04L 9/50 |
| 2020/0104835 | A1* | 4/2020 | Day | G06Q 20/389 |
| 2020/0167773 | A1* | 5/2020 | Cervenka | H04L 9/0643 |
| 2020/0286048 | A1* | 9/2020 | Xu | G06Q 20/065 |
| 2021/0150512 | A1* | 5/2021 | Yun | G06Q 20/0658 |
| 2021/0304197 | A1* | 9/2021 | Pomassl | G06Q 20/3223 |
| 2024/0346584 | A1* | 10/2024 | McWilliams | G06Q 40/04 |

FOREIGN PATENT DOCUMENTS

| CN | 107220837 | 9/2017 | |
| CN | 108171609 | 6/2018 | |
| CN | 108305074 | 7/2018 | |
| CN | 108305169 | 7/2018 | |
| CN | 108428120 | 8/2018 | |
| CN | 108492093 | 9/2018 | |
| CN | 108510252 | 9/2018 | |
| CN | 108604344 | 9/2018 | |
| CN | 109472696 | 3/2019 | |
| WO | WO-2020027408 A1* | 2/2020 | G06Q 20/065 |

OTHER PUBLICATIONS

Satoshi Nakamoto, Bitcoin: A Peer-to-Peer Electronic Cash System, Oct. 31, 2008 (Year: 2008).*
Satoshi Nakamoto, Bitcoin: A Peer-to-Peer Electronic Cash System, Oct. 31, 2008, pp. 1-9 (Year: 2008).*
Andreas M. Antonopoulos, Mastering Bitcoin, Mar. 2014, O'Reilly Media, Inc., pp. 1-282 (Year: 2014).*
Chinese Office Action issued Jan. 26, 2021 in Chinese Application No. 201811145446.8 (with Concise Explanation of Relevance).
Chinese Office Action issued Mar. 31, 2021 in Chinese Application No. 201910677654.0 (with Concise Explanation.
International Search Report issued Jan. 2, 2020 in PCT Application No. PCT/CN2019/108412 (with English Translation).
Written Opinion issued Jan. 2, 2020 in PCT Application No. PCT/CN2019/108412.

* cited by examiner

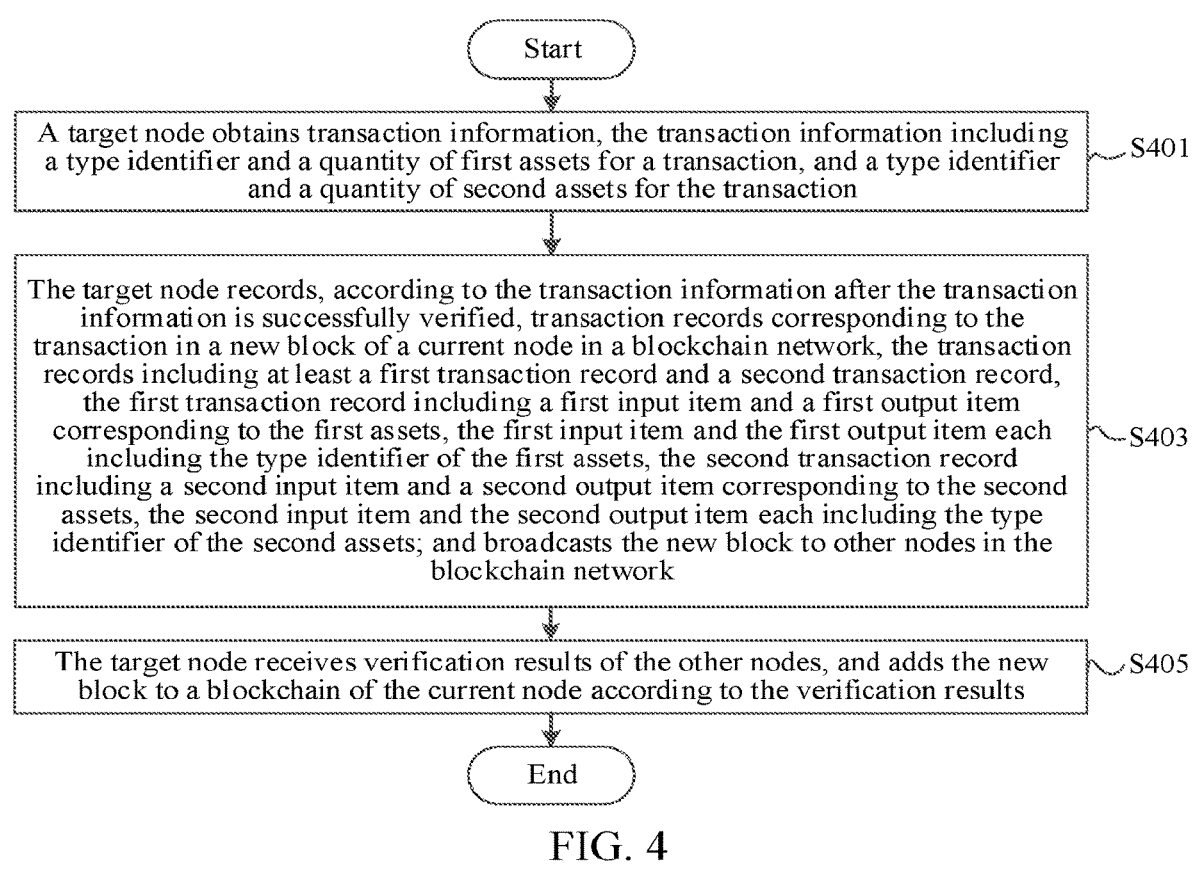

Start

A target node obtains transaction information, the transaction information including a type identifier and a quantity of first assets for a transaction, and a type identifier and a quantity of second assets for the transaction ⟩ S401

The target node records, according to the transaction information after the transaction information is successfully verified, transaction records corresponding to the transaction in a new block of a current node in a blockchain network, the transaction records including at least a first transaction record and a second transaction record, the first transaction record including a first input item and a first output item corresponding to the first assets, the first input item and the first output item each including the type identifier of the first assets, the second transaction record including a second input item and a second output item corresponding to the second assets, the second input item and the second output item each including the type identifier of the second assets; and broadcasts the new block to other nodes in the blockchain network ⟩ S403

The target node receives verification results of the other nodes, and adds the new block to a blockchain of the current node according to the verification results ⟩ S405

End

FIG. 4

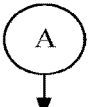

The target node records, according to the transaction information after the transaction information is successfully verified, transaction records corresponding to the transaction in a new block of a current node in a blockchain network; broadcasts the new block to other nodes in the blockchain network; and receives verification results of the other nodes, and adds the new block to a blockchain of the current node according to the verification results — S604

The target node records the first transaction record in the new block of the current node in the blockchain network according to the source of the first assets, the proof of expense of the first assets, the first output account address corresponding to the first assets, and the first expense condition corresponding to the first output account address — S6041

The target node determines the first input item according to the source of the first assets and the proof of expense of the first assets — S60411

The target node determines the first output item according to the first output account address corresponding to the first assets, the type identifier and the quantity of the first assets, and the first expense condition corresponding to the first output account address — S60412

The target node records the first input item and the first output item as the first transaction record in the new block of the current node in the blockchain network — S60413

The target node records the second transaction record in the new block of the current node in the blockchain network according to the source of the second assets, the proof of expense of the second assets, the second output account address corresponding to the second assets, and the second expense condition corresponding to the second output account address — S6042

The target node determines the second input item according to the source of the second assets and the proof of expense of the second assets — S60421

The target node determines the second output item according to the second output account address corresponding to the second assets, the type identifier and the quantity of the second assets, and the second expense condition corresponding to the second output account address — S60422

The target node records the second input item and the second output item as the second transaction record in the new block of the current node in the blockchain network — S60423

End

FIG. 7

A target node receives an asset query request transmitted by a first client — S11

The target node searches for, according to an account address carried in the asset query request, a transaction record corresponding to the account address in a blockchain — S12

The target node determines one or more asset types corresponding to the account address and an asset quantity corresponding to each asset type according to the found transaction record — S13

The target node transmits the one or more asset types corresponding to the account address and the asset quantity corresponding to the each asset type to the first client — S14

FIG. 8

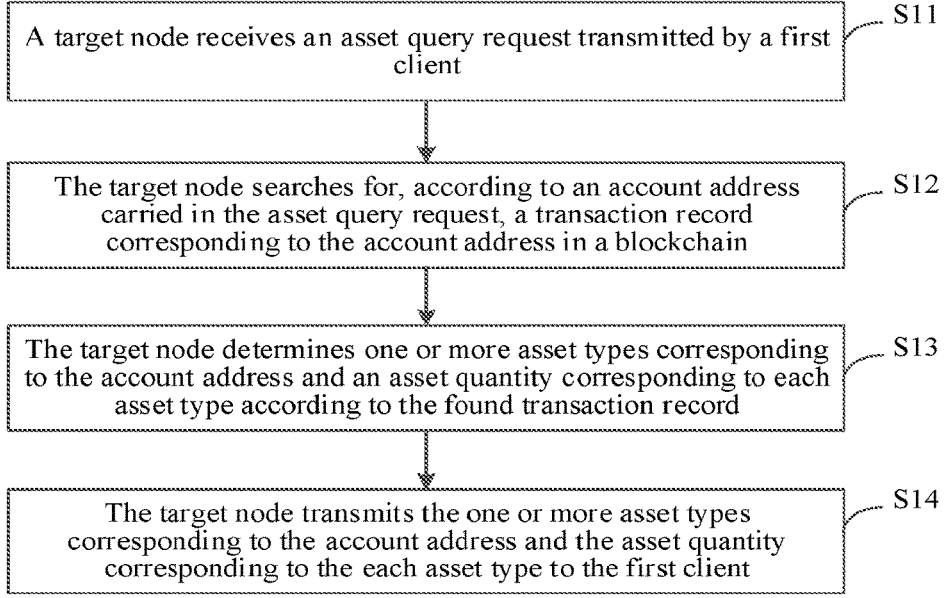

| Transaction number 1001　　Transaction hash value | | | | | | | | |
|---|---|---|---|---|---|---|---|---|
| Transaction input | | | | Transaction output | | | | |
| Input source | Asset type | Asset quantity | Proof of expense | Item number | Output account address | Asset type | Asset quantity | Expense condition |
| 50 1001(1) | Id=1 | 100 | Private key signature of A | (1) | Wallet address of B | Id=1 | 100 | Public key of B |
| 80 1006(3) | Id=2 | 50 | Private key signature of B | (2) | Wallet address of A | Id=2 | 50 | Public key of A |

FIG. 9

| Transferred-out assets |
| --- |
| Asset type _____ |
| Asset quantity _____ |
| Wallet address of payee _____ |
| Transferred-in assets |
| Asset type _____ |
| Asset quantity _____ |
| My wallet address _____ |

FIG. 11

ASSET TRANSACTION METHOD, STORAGE MEDIUM, AND COMPUTER DEVICE

RELATED APPLICATION

This application is a continuation of International Application No. PCT/CN2019/108412, filed on Sep. 27, 2019, which claims priority to Chinese Patent Application No. 201811145446.8, entitled "ASSET TRANSACTION METHOD AND APPARATUS, STORAGE MEDIUM, AND COMPUTER DEVICE" filed on Sep. 29, 2018. The entire disclosures of the prior applications are hereby incorporated by reference in their entirety.

FIELD OF THE TECHNOLOGY

This application relates to the field of computer technologies, including an asset transaction method, a storage medium, and a computer device.

BACKGROUND

The blockchain technology (BT for short), also referred to as the distributed ledger technology, is an Internet database technology. The BT is characterized by decentralization, openness and transparency, allowing everyone to participate in database records. The BT originally is the basic technology for implementing bitcoin transactions, and at present starts being applied to fields such as finance. Transaction information of only the same type of assets can be stored on the same blockchain, and a transaction between different types of assets cannot be implemented on the same blockchain.

SUMMARY

In a transaction method, transaction information is obtained. The transaction information includes a type identifier and quantity of first assets, and a type identifier and quantity of second assets. Transaction records, corresponding to a transaction in a block, are stored upon verification of the transaction information. The transaction records include first and second transaction records. The first transaction record includes first input and output items corresponding to the first assets, and the first input and output items each includes the type identifier of the first assets. The second transaction record includes second input and output items corresponding to the second assets, and the second input and output items each includes the type identifier of the second assets. The block is broadcasted to other nodes in the blockchain network, and verification results are received. The block is added to a blockchain of the current node based on the verification results.

A processing apparatus includes circuitry that obtains transaction information. The transaction information includes a type identifier and a quantity of first assets for a transaction, and a type identifier and a quantity of second assets for the transaction. The circuitry records, according to the transaction information after the transaction information is successfully verified, transaction records corresponding to the transaction in a new block of a current node in a blockchain network. The transaction records include at least a first transaction record and a second transaction record. The first transaction record includes a first input item and a first output item corresponding to the first assets, and the first input item and the first output item each includes the type identifier of the first assets. The second transaction record includes a second input item and a second output item corresponding to the second assets, and the second input item and the second output item each includes the type identifier of the second assets. The circuitry broadcasts the new block to other nodes in the blockchain network, receives verification results of the other nodes, and adds the new block to a blockchain of the current node according to the verification results.

A non-transitory computer-readable storage medium, storing computer-readable instructions thereon, the computer-readable instructions, when executed by processing circuitry, cause the processing circuitry to obtain transaction information. The transaction information includes a type identifier and a quantity of first assets for a transaction, and a type identifier and a quantity of second assets for the transaction. The processing circuitry also records, according to the transaction information after the transaction information is successfully verified, transaction records corresponding to the transaction in a new block of a current node in a blockchain network. The transaction records include at least a first transaction record and a second transaction record. The first transaction record includes a first input item and a first output item corresponding to the first assets, and the first input item and the first output item each includes the type identifier of the first assets. The second transaction record includes a second input item and a second output item corresponding to the second assets, and the second input item and the second output item each includes the type identifier of the second assets. The processing circuitry broadcasts the new block to other nodes in the blockchain network, receives verification results of the other nodes, and adds the new block to a blockchain of the current node according to the verification results.

BRIEF DESCRIPTION OF THE DRAWINGS

A more complete appreciation of illustrative embodiments of the invention and many of the attendant advantages thereof will be readily obtained as the same becomes better understood by reference to the following detailed description when considered in connection with the accompanying drawings, wherein:

FIG. 4 is a schematic flowchart of an asset transaction method according to exemplary embodiments of the present disclosure.

FIG. 6 to FIG. 8 are schematic flowcharts of an asset transaction method according to exemplary embodiments of the present disclosure.

FIG. 9 is a schematic structural diagram of a transaction record according to exemplary embodiments of the present disclosure.

FIG. 11 is a schematic diagram of an asset transaction page according to exemplary embodiments of the present disclosure.

DETAILED DESCRIPTION

The following describes exemplary embodiments of the present disclosure. However, the following descriptions should not be considered as limiting upon the present disclosure, and one of ordinary skill in the art will recognize that numerous variations are possible without departing from the scope of the present disclosure. As such, the details described herein are merely to aid the reader in obtaining a better understanding of the inventive concepts of the disclosure. In the following, "include" refers to "include, but is not limited to", and "according to . . . " refers to "at least according to . . . , but not limited to only according to." In the specification and claims, "including" means at least including to some extent and is to be interpreted as including a feature in addition to a feature mentioned later.

Figure 1:
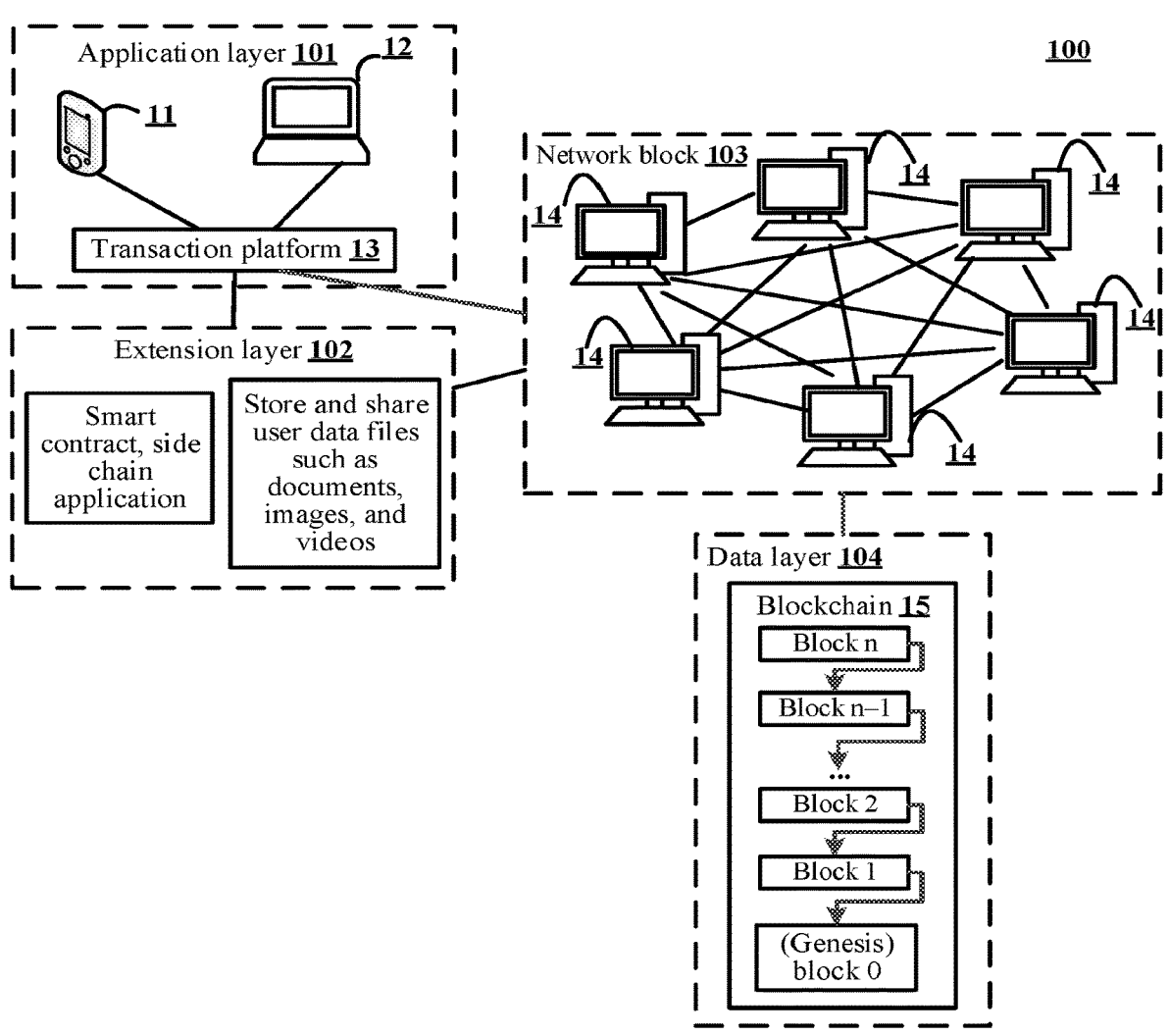
FIG. 1 is an architectural diagram of a system according to exemplary embodiments of the present disclosure.

This present disclosure provides an asset transaction method and apparatus, a storage medium, and a computer device. The method may be applied to a blockchain system 100 shown in FIG. 1. As shown in FIG. 1, the system 100 at least includes an application layer 101, a network layer 103, and a data layer 104, or further includes an extension layer 102 or the like. The application layer 101 provides application clients 11 and 12 (for example, wallet clients for digital asset transactions) and a transaction platform 13 for a user. The application clients 11 and 12 run on a terminal device. The terminal device may include a PC machine, a mobile phone, a tablet computer, a palmtop computer, an ultrabook, a wearable device and the like. The user may log in to the transaction platform 13 by operating user interfaces (UI) provided by the application clients 11 and 12 to complete various transaction operations, for example, a digital asset transaction, a shared ledger review. The transaction platform 13 may include a server or a server cluster, or include a distributed system. The extension layer 102 provides some extension application service functions. The functions include side chain applications such as smart contracts, and may also include functions of storing and sharing user data files such as documents, images, and videos. The user may implement functions such as smart contract signing, data file storage and sharing through the extension layer 102 by operating the UIs provided by the application clients 11 and 12. The network layer 103 includes a plurality of blockchain nodes 14 distributed in regions. The nodes 14 form a blockchain network. Each node 14 may be a computing device with a point-to-point (P2P) communication function, such as, a desktop computer, a notebook computer, or a tablet computer. The blockchain nodes 14 form a P2P network. Each node 14 stores complete data of a blockchain 15. The network layer 103 is configured to implement communication between the nodes 14, and encapsulate a P2P networking mechanism, a data transmission mechanism, a verification mechanism, and the like between the nodes 14. The blockchain network is essentially a P2P network. Each node 14 both receives and generates information. The nodes 14 maintain a common blockchain to maintain communication. In a blockchain network, each node 14 may create a new block. Other nodes are notified in a manner of broadcast after the new block is created, and then verify the block. If verification by the nodes in the entire blockchain network is successful, the new block may be added to the blockchain. The data layer 104 encapsulates a data structure of the blockchain 15. As shown in FIG. 1, a blockchain 15 is formed by linking a plurality of blocks (blocks 0 to n). The block 0 first created is a "genesis block", and blocks that have the same data structure and that are then created under a particular rule are sequentially connected through a chain structure to form a main chain. As the running time gets increasingly long, new blocks, after successfully verified, are continuously added to the main chain, and the main chain also continuously extend.

FIG. 1 shows a part of the blockchain system 100. In exemplary aspects, there are further a consensus layer, an incentive layer, and the like above the network layer 103. The consensus layer encapsulates a consensus mechanism, so that the highly distributed nodes 14, in the decentralized system, efficiently reach a consensus on validity of block data. That is, all the nodes 14 agree on how to reach a consensus to determine validity of a transaction record set. This both serves as identification and as prevention to tampering. Relatively common consensus mechanisms mainly include a proof of work, a proof of stake, and a delegated proof of stake.

In the blockchain system, data is permanently recorded in the form of files, and the files may be referred to as blocks. One block may include a transaction record set occurring in a period of time, and the transaction record set is not recorded by a previous block. Blocks created by the nodes 14 are sequentially linked. A new block is generally added to a tail of a blockchain and linked to a previous block. A transaction represents an operation by a user in a transaction system. This causes a change of a ledger state, and a corresponding transaction record is added to a ledger. A block records transactions and state results occurring in a period of time, and is a consensus on a current ledger state. A chain is formed by linking blocks in series according to an order of creation time, and is a log record of changes of an entire ledger state.

Figure 2:
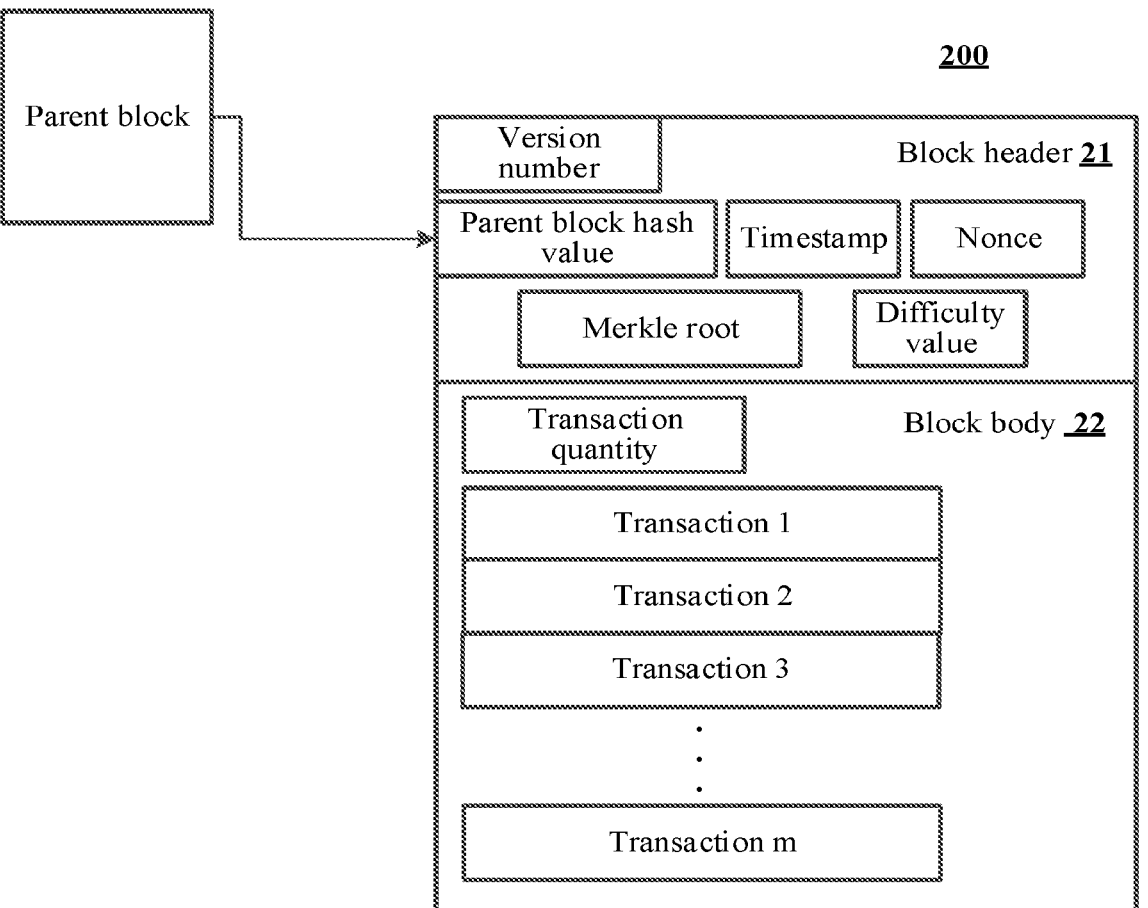
FIG. 2 is a diagram of a data structure of a block according to exemplary embodiments of the present disclosure.

A block is a data structure recording a transaction. Each block is composed of a block header and a block body. The block body is responsible for recording transaction information in a previous period of time. The block header records information used for linking parent blocks, a mining competition, and transaction data verification. FIG. 2 shows a data structure of a block 200. As shown in FIG. 2, the block 200 includes a block header 21 and a block body 22. The block body 22 records a transaction quantity and information about each transaction occurring in a period of time, for example, transaction information about transaction 1, transaction 2, . . . , and transaction m. The block header 21 records the following information fields.

A first field includes a version number used for identifying relevant version information about software and a protocol.

A second field includes a parent block hash value which is a block header hash value of a parent block of the block 200. Each block is connected end to end to form a blockchain through the value, which plays a vital role in the security of the blockchain.

A third field includes a Merkle root, which is a value calculated by hashing hash values of all transaction information in the block body 22 in pairs step by step. The Merkle root is mainly used for verifying whether a transaction exists in this block.

A fourth field includes a timestamp that records a creation time of the block 200. The timestamp is accurate to a second.

A fifth field includes a difficulty value, which is a difficulty target value of a mathematical question related to the block 200.

A sixth field includes a nonce, which is a value of an answer of decrypting the mathematical question related to the block 200.

After the block 200 is added to a blockchain, all miners (that is, all the blockchain nodes 14) start a generation operation of a next block, including the following steps.

In a first step, transaction information is recorded in a local internal memory into a block body.

In a second step, a Merkle tree of all transaction information in the block in the block body is generated, and a value (that is, a Merkle root) of a Merkle tree root is stored in the block header.

In a third step, a hash value is generated, through the SHA256 algorithm, from data of a block header of a block 200A recently added to a blockchain, and the hash value is filled in parent block hash values of a current block.

In a fourth step, a current time is stored in a timestamp field.

In a fifth step, a difficulty value field is adjusted according to an average generation time of blocks in a previous period of time, to cope with an ever-changing overall calculation volume of an entire network. Thus, if the calculation volume increases, a system increases a difficulty value of a mathematical question, so that an expected time to complete a next block is still within a particular period of time.

For a block, a block header hash value may uniquely identify the block, and any blockchain node 14 may independently obtain the block header hash value by performing hash calculation on the block header. The block header hash value is actually not included in a data structure of the block. The block header hash value may be stored as a part of block metadata in an independent database table, to help index and faster retrieve blocks from a disk. In addition, a block further has a block height in a blockchain. The block height may be used for identifying a position of the block in the blockchain. A block height of a first block (that is, a genesis block) is 0, and a height of a block referencing the genesis block is 1. Thus, each block subsequently stored in the blockchain is "higher" by one position than a previous block, and a block height value is equal to a block height value of the previous block plus one. Different from the block header hash value, the block height is not a unique identifier of a block. Two or more blocks may have the same block height, fighting for the same position in the blockchain. The block height is not a part of the data structure of the block either, and is not stored in the block. The blockchain node 14, when receiving a block from a blockchain network, dynamically identifies the position (that is, the block height) of the block in the blockchain. The block height may also be stored as metadata in an index database table for a fast retrieval.

Figure 3:
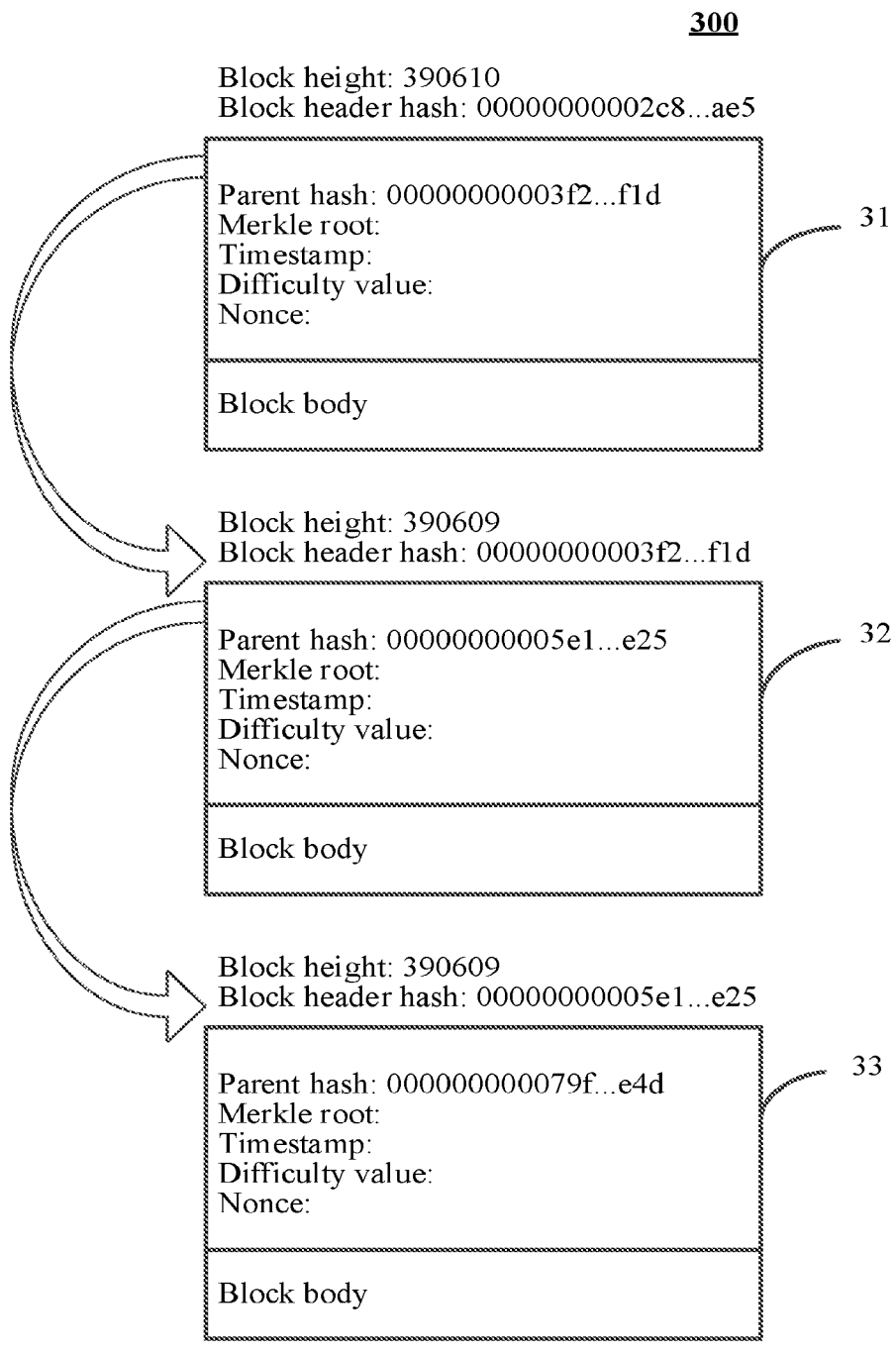
FIG. 3 is a partial schematic diagram of a blockchain according to exemplary embodiments of the present disclosure.

FIG. 3 is a partial schematic diagram of a blockchain according to an embodiment of this application. FIG. 3 shows three blocks: 31, 32 and 33. Block heights and block header hash values of the blocks are not recorded in the blocks, but determine a linking relationship between the blocks. The block heights and the block header hash values of the blocks may be stored in a blockchain metadata table in a local database of the blockchain nodes 14.

In exemplary embodiments, transaction information about different types of assets is stored in different blockchains. For example, transaction information about bitcoins is stored in one blockchain, and transaction information about ether is stored in another blockchain. It is impossible to implement transactions between different digital assets based on the same blockchain.

To resolve the foregoing technical problems, this application provides an asset transaction method and apparatus, a storage medium, and a computer device. The asset transaction method provided in this application may be performed by any node in the network layer 103. As shown in FIG. 4, the method mainly includes the following steps.

In step S401, a target node obtains transaction information. The transaction information includes a type identifier and a quantity of first assets for a transaction, and a type identifier and a quantity of second assets for the transaction.

The target node may be any node in the blockchain system. The target node may obtain transaction information from a transaction request. The transaction request may be a transaction request transmitted by an application client 11 or 12 on a terminal device to any node in the blockchain network. The transaction request carries the type identifier and the quantity of the first assets, and the type identifier and the quantity of the second assets for the transaction. In such a case, before the transaction request is transmitted, two parties performing a transaction by using the first assets and the second assets have reached a contract on the quantities of the first assets and the second assets for the transaction. The blockchain network may further store a transaction exchange rate between the first assets and the second assets. When an asset type is released, a transaction exchange rate between the asset type and another asset type may be released at the same time, to store a transaction exchange rate between different asset types on the blockchain. The two parties performing the transaction may both check a transaction exchange rate between two types of assets stored on the blockchain network. In such a case, the obtaining transaction information includes obtaining the type identifier and the quantity of the first assets and the type identifier of the second assets from the transaction request, searching for, in a blockchain, the transaction exchange rate between the first assets and the second assets according to the type identifiers of the first assets and the second assets, and then determining the quantity of the second assets for the transaction.

In step S403, the target node records, according to the transaction information after the transaction information is successfully verified, transaction records corresponding to the transaction in a new block of a current node in a blockchain network. The transaction records include at least a first transaction record and a second transaction record. The first transaction record includes a first input item and a first output item corresponding to the first assets, and the first input item and the first output item each includes the type identifier of the first assets. The second transaction record includes a second input item and a second output item corresponding to the second assets, and the second input item and the second output item each includes the type identifier of the second assets. The new block is then broadcast to other nodes in the blockchain network.

The target node verifies the transaction information, mainly verifying whether a user corresponding to the first assets has a right to dispose the first assets, and a user corresponding to the second assets has a right to dispose the second assets. The transaction information may further include a source and a proof of expense of the first assets and a source and a proof of expense of the second assets. When verifying the first assets, the target node may search for an expense condition of the first assets according to the source of the first assets, and verify the first assets according to the expense condition and the proof of expense of the first assets. Correspondingly, the target node may verify the second assets according to an expense condition and the proof of expense of the second assets. The proof of expense may include a private key signature, and a corresponding expense condition may include a public key. During verification, the private key signature is verified by using the public key. The proof of expense may further include a public key in combination with the private key signature, and a corresponding expense condition may include a public key hash value. The target node may verify, during verification, the public key hash value according to the public key, and verify, after the verification succeeds, the private key signature according to the public key. Transaction records corresponding to the transaction information include two records, that is, the first transaction record corresponding to the first assets, and the second transaction record corresponding to the second assets. Formats of the first transaction record and the second transaction record may be shown in FIG. 9. The first transaction record may include the type identifier and the quantity of the first assets. The second transaction record may include the type identifier and the quantity of the second assets. Transaction records of two asset types are stored in a blockchain, so that transactions between different assets may be implemented based on the same blockchain. A transaction between more than two asset types may be implemented by using the asset transaction method provided in this application. Transaction Information about more than two asset types is stored in a corresponding blockchain.

In this exemplary embodiment of the present disclosure, the first input item of the first transaction record may include an input source, an asset type, an asset quantity, and a proof of expense. The first output item of the first transaction record may include an output account address, the asset type, the asset quantity, and an expense condition. The second input item of the second transaction record may include an input source, an asset type, an asset quantity, and a proof of expense. The second output item of the second transaction record may include an output account address, the asset type, the asset quantity, and an expense condition.

In step S405, the target node receives verification results of the other nodes, and adds the new block to a blockchain of the current node according to the verification results.

When a quantity of verification results of successful verification in received verification results meets a preset condition, for example, more than 51% nodes succeed in verification, the target node may add the new block to the blockchain of the current node.

According to the exemplary embodiments of the present disclosure, transaction information of different types of assets is recorded on the same blockchain. That is, a transaction between different types of assets may be implemented on a blockchain, to prevent the transaction information of different types of assets from being recorded on different blockchains, reduce occupation of storage space of each node in the blockchain network, and improve the processing efficiency of each node.

Figure 5:
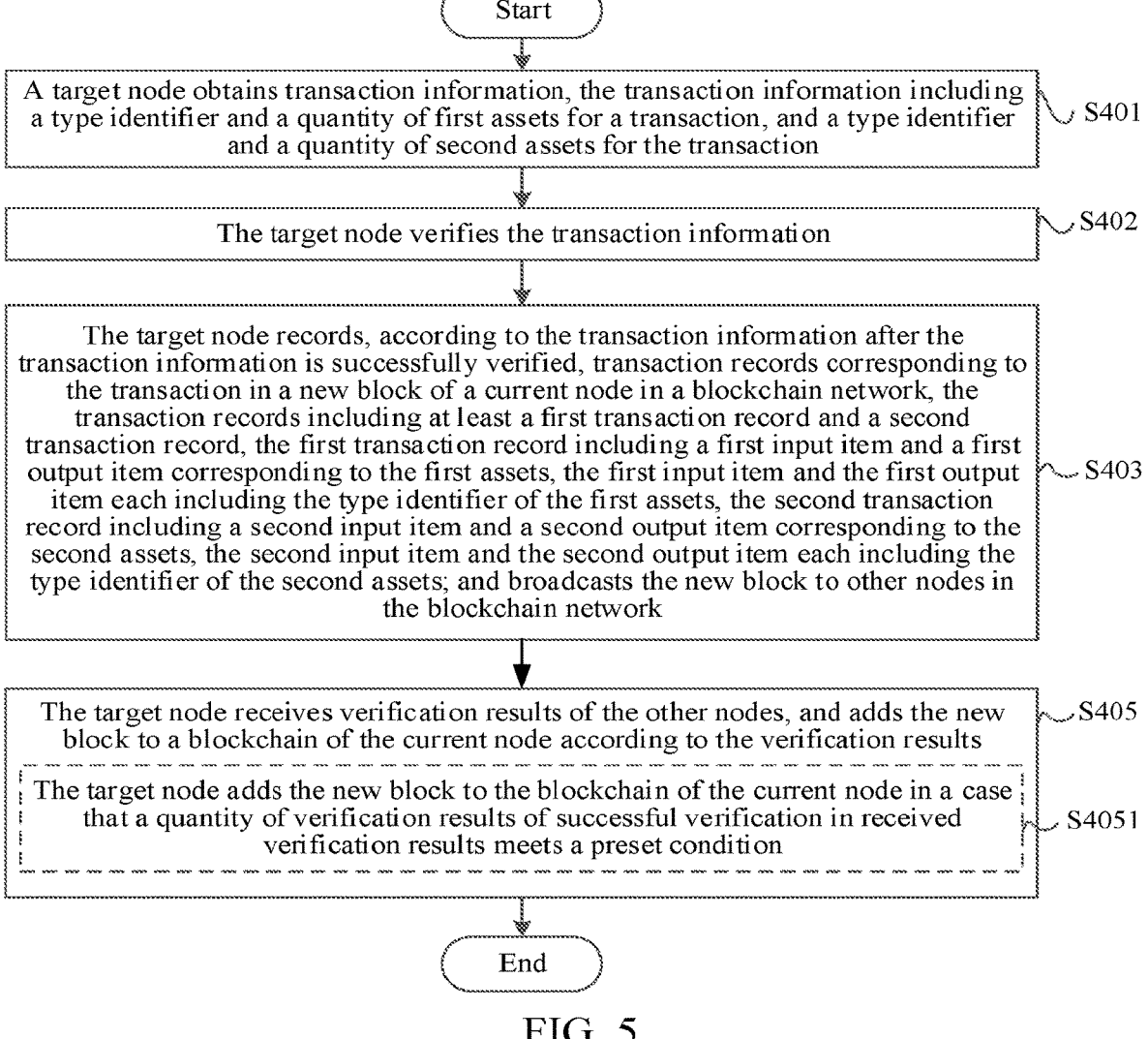
FIG. 5 is a schematic flowchart of an asset transaction method according to exemplary embodiments of the present disclosure.

In exemplary embodiments, after step S401, that is, after the transaction information is obtained, the method may further include a step of verifying the transaction information. As shown in FIG. 5, the method includes step 402.

In step S402, the target node verifies the transaction information.

When the transaction information is verified, the verification includes verification of the first assets and verification of the second assets. Specifically, the target node may search for the expense condition of the first assets according to the source of the first assets, and verify the first assets according to the expense condition of the first assets and the proof of expense of the first assets. The target node may search for the expense condition of the second assets according to the source of the second assets, and verify the second assets according to the expense condition of the second assets and the proof of expense of the second assets. In an exemplary embodiment of the present disclosure, the proof of expense may include a private key signature, and a corresponding expense condition may include a public key. During the verification, the target node may verify the private key signature by using the public key. For example, description is made by using an example shown in FIG. 9. A user A transacts with a user B by using assets of id=1 for assets of id=2. A proof of expense of the assets of id=1 includes a private key signature of A. An expense condition found from an input source of the assets of id=1 includes a public key of the user A. The target node may verify the private key signature of the user A by using the public key of the user A. The target node verifies the assets of id=2 similarly. Details are not described herein again. In a possible implementation, a proof of expense may further include the public key in combination with the private key signature, and a corresponding expense condition may include a public key hash value. The target node may verify, during verification, the public key hash value according to the public key, and verify, after the verification succeeds, the private key signature according to the public key. Specifically, description is made by still using the foregoing example. The proof of expense of the assets of id=1 includes the private key signature of A and the public key of A. The expense condition found from the input source of the assets of id=1 includes a public key hash value of the user A. The public key hash value of the user A is verified by using the public key of the user A. After the verification succeeds, the private key signature of the user A is verified by using the public key of the user A. After the verification succeeds, the assets of id=1 are successfully verified. The target node verifies the assets of id=2 similarly. Details of this verification are not described herein again for the sake of brevity.

In exemplary embodiments, the adding the new block to a blockchain of the current node according to the verification results includes the following step.

In step S4051, the target node adds the new block to the blockchain of the current node in a case that a quantity of verification results of successful verification in received verification results meets a preset condition.

In an exemplary embodiment, the preset condition may be that more than 51% nodes succeed in verification. According to exemplary embodiments, when a quantity of nodes succeeding in verification meets the preset condition, the target node may add the new generated block to a blockchain, so that transaction records stored on the blockchain cannot be tampered with, thereby ensuring the security of data. The transaction records, before stored on the new block, are verified, to ensure the validity of transactions.

Figure 6:
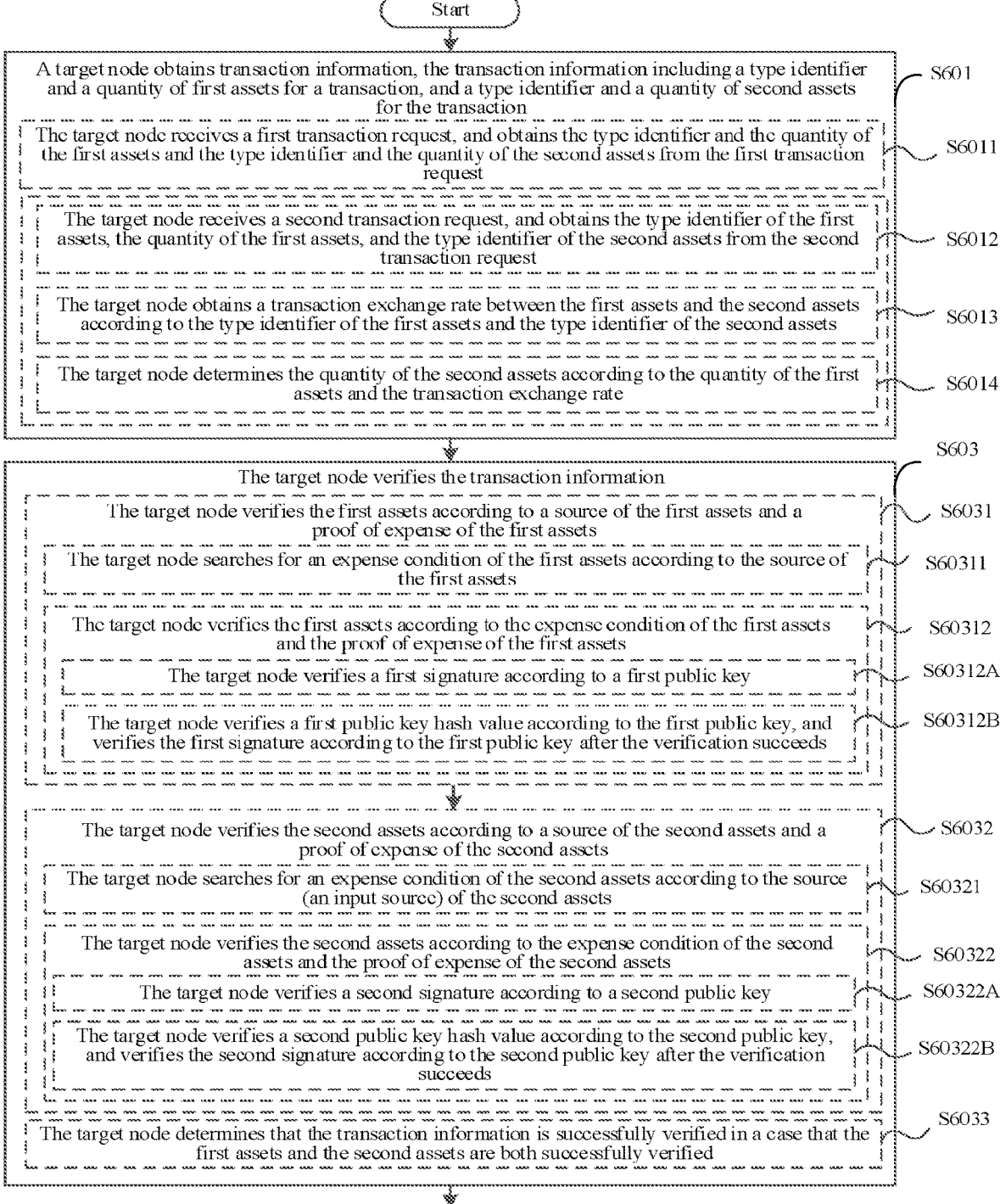

A flowchart of the asset transaction method provided in this application is shown in FIG. 6 and FIG. 7, including the following steps.

In step S601, the target node obtains transaction information. The transaction information includes a type identifier and a quantity of first assets for a transaction, and a type identifier and a quantity of second assets for the transaction.

The transaction information is information about digital transactions between different types of digital assets. The transaction information may be directly transmitted to the target node by an application client. The transaction information may alternatively be transmitted to a proxy server (for example, the proxy server may be a transaction platform 13) by the application client. The transaction platform 13 transmits the transaction information to the target node. The transaction platform 13 may parse transaction content in the transaction information, and generate transaction information in a format conforming to the blockchain system.

The transaction information received by the target node is the transaction information in a format conforming to the blockchain system. Specifically, description is made by using an example in which the user A exchanges 100 bitcoins for 50 ethers of the user B. It is assumed that an id of bitcoins is 1, and an id of ethers is 2. A format of the transaction records corresponding to the transaction information is shown in FIG. 9. The transaction information includes a transaction number, a transaction hash value, a first transaction record, and a second transaction record. Both the first transaction record and the second transaction record include a transaction input and a transaction output. The first transaction record corresponds to transaction information "A transfers 100 bitcoins to B", and the second transaction record corresponds to transaction information "B transfers 50 ethers to A". A transaction hash value is a hash value obtained by performing a hash calculation on information included in the two transaction records. For information included in transaction records, using the first transaction record as an example for description, the first transaction record includes the transaction input (a first input item) and the transaction output (a first output item). The transaction record includes the following content.

A transaction input, which includes an input source, an asset type, and asset quantity, and a proof of expense.

An input source may be, for example, an asset source of an asset transferor. The input source is a source of 100 bitcoins of the user A. When A transfers 100 bitcoins to B, the user A may search for an output of his/her wallet address having bitcoins on his/her application client (for example, a wallet client) for selection. The application client adds input source information to transaction information according to the selection of the user A. The input source includes information an output (an output identifier) of a transaction (a transaction number) of a block (a block height). For example, in FIG. 9, a first output of a $1001^{st}$ transaction in a $50^{th}$ block in a blockchain corresponding to the wallet address of the user A has 100 bitcoins.

An asset type represents a type identifier of assets. A transfers 100 bitcoins, and therefore id=1. Transactions between different assets may be implemented in this application. Asset types may be various, and include virtual assets, for example, bitcoins or ethers, or may include physical assets, for example, cars or pets.

An asset quantity corresponds to an asset type for a transaction. An asset type and quantity corresponding to assets may also be found according to an input source. Therefore, an asset type or an asset quantity may alternatively not be included in a transaction input.

A proof of expense is used for verifying whether a user has a right to dispose corresponding assets. When the user A transacts with the user B, the user A and the user B sign transaction content by using respective private keys. The private key signatures are respectively used as a proof of expense of the first transaction record and a proof of expense of the second transaction record. The transaction content includes a source, an asset type, a quantity, an output account address, and an expense condition of the bitcoins of the user A, and a source, an asset type, a quantity, an output account address, and an expense condition of the ethers of the user B. During signing, a hash calculation is first performed on information in the transaction content to obtain a hash value, the hash value is signed by using a private key of the user A to obtain a private key signature of A as the proof of expense of the first transaction record, and the hash value is signed by using a private key of the user B to obtain a private key signature of B as the proof of expense of the second transaction record. The proof of expense may include a private key signature of a corresponding user, and may further include a public key of the corresponding user.

A transaction output includes an item number, an output account address, an asset type, an asset quantity, and an expense condition.

An item number represents a number of an output of a transaction.

An output account address is a wallet address of an asset receiving party. In the first transaction record, the output account address is a wallet address of the user B. In the second transaction record, the output account address is a wallet address of the user A.

An asset type is a type identifier of assets.

An asset quantity is an asset quantity corresponding to the asset type.

An expense condition is used for verifying the proof of expense, and verifying together with the proof of expense whether a corresponding user has a right to dispose assets. The expense condition corresponds to the proof of expense. When the proof of expense includes a private key signature, the expense condition includes a public key of the corresponding user. When the proof of expense includes the public key and the private key signature, the expense condition includes a public key hash value. In FIG. 9, description is made by using an example in which the proof of expense includes the private key signature, and the expense condition includes the public key of the corresponding user. In the first transaction record, an expense condition in the transaction output is a public key of B. When intending to dispose the 100 bitcoins subsequently, the user B needs to sign subsequent transaction content. The signature can be successfully verified by using only the public key of B. When the verification succeeds, it indicates that the 100 bitcoins belong to the user B, and the user B has a right to dispose the 100 bitcoins.

Information included in the second transaction record is similar to the information included in the first transaction record. Therefore, details relating to the second transaction are not described herein again for the sake of brevity.

There are two manners to obtain the transaction information. The first manner includes the following step.

In step S6011, the target node receives a first transaction request, and obtains the type identifier and the quantity of the first assets and the type identifier and the quantity of the second assets from the first transaction request.

A quantity of assets transacted by two parties in a transaction is the quantity of the first assets and the quantity of the second assets in the transaction, and the type identifier and the quantity of the first assets, and the type identifier and the quantity of the second assets are added to the transaction request and transmitted to a node in the blockchain network.

In a second manner, the transaction request includes the type identifier and the quantity of the first assets, and the type identifier of the second assets. A blockchain node may obtain a transaction exchange rate between the first assets and the second assets, and determine the quantity of the second assets according to the transaction exchange rate. The second manner includes the following steps.

In step S6012, the target node receives a second transaction request, and obtains the type identifier of the first assets, the quantity of the first assets, and the type identifier of the second assets from the second transaction request.

In step S6013, the target node obtains a transaction exchange rate between the first assets and the second assets according to the type identifier of the first assets and the type identifier of the second assets.

In step S6014, the target node determines the quantity of the second assets according to the quantity of the first assets and the transaction exchange rate.

When determining the transaction exchange rate between the first assets and the second assets in a transaction, the target node may query a third-party server to obtain a transaction exchange rate between two types of assets. The target node may further search a blockchain for a transaction exchange rate between two types of assets. For example, when assets are released, the transaction exchange rate between the assets may be transmitted to the target node and then stored on a blockchain. The transaction exchange rate is stored on the blockchain, is non-modifiable, and may be queried by each client. The target node may determine the quantity of the second assets according to the quantity of the first assets and the transaction exchange rate after the transaction exchange rate is found.

In step S603, the target node verifies the transaction information.

The transaction information further includes the source (for example, the input source in FIG. 9) of the first assets, the source of the second assets, the proof of expense of the first assets, and the proof of expense of the second assets. When the target node verifies the transaction information, the verification includes verification of the first assets and verification of the second assets, to respectively correspond to steps S6031 and S6032. A sequence of performing steps S6031 and S6032 is not limited herein.

In step S6031, the target node verifies the first assets according to the source of the first assets and the proof of expense of the first assets.

In exemplary embodiments, step S6031 may include the following steps S60311 and S60312.

In step S60311, the target node searches for an expense condition of the first assets according to the source of the first assets.

In step S60312, the target node verifies the first assets according to the expense condition of the first assets and the proof of expense of the first assets.

In step S6032, the target node verifies the second assets according to the source of the second assets and the proof of expense of the second assets.

In exemplary embodiments, step S6032 may include the following steps S60321 and S60322.

In step S60321, the target node searches for an expense condition of the second assets according to the source (an input source) of the second assets.

In step S60322, the target node verifies the second assets according to the expense condition of the second assets and the proof of expense of the second assets.

The target node performs verification in two manners. In a first manner, the proof of expense may include a private key signature, and a corresponding expense condition may include a public key of a corresponding user. In a second manner, the proof of expense may include the public key in combination with the private key signature, and a corresponding expense condition may include a public key hash value.

For the first manner, the proof of expense of the first assets includes a first signature determined according to a private key corresponding to the first assets, the proof of expense of the second assets includes a second signature determined according to a private key corresponding to the second assets, an expense condition found according to the source of the first assets includes a first public key corresponding to the first assets, and an expense condition found according to the source of the second assets includes a second public key corresponding to the second assets.

Step S60312 may include step S60312A in which the target node verifies the first signature according to the first public key.

Step S60322 may include step S60322A in which the target node verifies the second signature according to the second public key.

For the second verification manner, the proof of expense of the first assets may include the first signature determined according to the private key corresponding to the first assets and the first public key corresponding to the first assets, the proof of expense of the second assets may include the second signature determined according to the private key corresponding to the second assets and the second public key corresponding to the second assets, the expense condition found according to the source of the first assets may include a public key hash value corresponding to the first assets, and the expense condition found according to the source of the second assets may include a public key hash value corresponding to the second assets.

Step S60312 may include step S60312B in which target node verifies the first public key hash value according to the first public key, and verifies the first signature according to the first public key after the verification succeeds.

Step S60322 may include the following steps.

In step S60322B, the target node verifies the second public key hash value according to the second public key, and verifies the second signature according to the second public key after the verification succeeds.

In step S6033, the target node determines that the transaction information is successfully verified in a case that the first assets and the second assets are both successfully verified.

Specifically, description is made by still using an example in which the user A exchanges 100 bitcoins for 50 ethers of the user B. The target node may respectively verify the first transaction record and the second transaction record. When verifying the first transaction record, the target node may search for, according to the input source, a transaction output of which an identifier of a $1001^{st}$ transaction in a $50^{th}$ block in a blockchain is (1). The transaction output includes an expense condition. When the expense condition includes the public key of the user A, the proof of expense includes a private key signature of the user A. The private key signature of the user A in the proof of expense is verified by using the public key of the user A in the expense condition. Because the proof of expense is the signing performed according to the private key of the user A, only the public key of the user A can be successfully verified. Therefore, when the verification succeeds, it indicates that assets corresponding to the output, namely, the input source: 50 1001 (1) belong to the user A, and the user A has a right to dispose the assets. In exemplary embodiments, the expense condition may include the public key hash value of the user A, and the corresponding proof of expense may include the public key of the user A and the private key signature of the user A. During the verification, the target node may perform a hash calculation on the public key of the user A in the proof of expense to obtain a hash value and compare the hash value with the public key hash value in the expense condition. If the hash value is not consistent with the public key hash value in the expense condition, the verification fails; if the hash value is consistent with the public key hash value in the expense condition, the private key signature of the user A is verified according to the public key of the user A. If the verification succeeds, the first transaction record is successfully verified; and if the verification fails, the first transaction record is not successfully verified. The verification manner of the second transaction record, similar to the verification manner of the first transaction record, is mainly used for verifying whether the user B has a right to dispose 50 ethers in an input source "80 100 (3)". The verification manners are similar. Details are not described herein again. Only when the first transaction record and the second transaction record are both successfully verified, the transaction information is successfully verified.

In addition, the transaction information transmitted to the target node may further include a transaction hash value, that is, a hash value of information included in the first transaction record and the second transaction record. When receiving the transaction information, the target node may perform a hash calculation on the information included in the first transaction record and the second transaction record, to obtain a hash value, and compare the hash value obtained through calculation with the hash value in the transaction information. If the hash value obtained through calculation is consistent with the hash value in the transaction information, it indicates that the transaction information is not tampered with during transmission, to ensure the security of the transaction information during transmission.

In step S604, the target node records, according to the transaction information after the transaction information is successfully verified, transaction records corresponding to the transaction in a new block of a current node in a blockchain network. The transaction records include at least a first transaction record and a second transaction record, and the first transaction record includes a first input item and a first output item corresponding to the first assets. The first input item and the first output item each includes the type identifier of the first assets. The second transaction record includes a second input item and a second output item corresponding to the second assets. The second input item and the second output item each includes the type identifier of the second assets. The target node broadcasts the new block to other nodes in the blockchain network, receives verification results of the other nodes, and adds the new block to a blockchain of the current node according to the verification results.

After the first transaction record and the second transaction record in the transaction information are both successfully verified, the transaction information is successfully verified. After a predetermined quantity of nodes successfully verify the new block, the target node may store the new block in a blockchain. The predetermined quantity may be set by a developer, for example, may be 51% nodes.

When the transaction information is recorded in a new block, the transaction information further includes a source of the first assets, a proof of expense of the first assets, a first output account address corresponding to the first assets, a first expense condition corresponding to the first output account address, a source of the second assets, a proof of expense of the second assets, a second output account address corresponding to the second assets, a second expense condition corresponding to the second output account address.

The recording, by the target node, according to the transaction information, transaction records corresponding to the transaction in a new block of a current node in a blockchain network includes step S6041.

In step S6041, the target node records the first transaction record in the new block of the current node in the blockchain network according to the source of the first assets, the proof of expense of the first assets. The first output account address corresponds to the first assets, and the first expense condition corresponds to the first output account address.

The determining, by the target node, the first transaction record includes the following steps.

In step S60411, the target node determines the first input item according to the source of the first assets and the proof of expense of the first assets.

In step S60412, the target node determines the first output item according to the first output account address corresponding to the first assets. The type identifier and the quantity of the first assets, and the first expense condition correspond to the first output account address.

In step S60413, the target node records the first input item and the first output item as the first transaction record in the new block of the current node in the blockchain network.

In step S6042, the target node records the second transaction record in the new block of the current node in the blockchain network according to the source of the second assets, the proof of expense of the second assets, the second output account address corresponding to the second assets, and the second expense condition corresponding to the second output account address.

The determining the second transaction record includes the following steps.

In step S60421, the target node determines the second input item according to the source of the second assets and the proof of expense of the second assets.

In step S60422, the target node determines the second output item according to the second output account address corresponding to the second assets, the type identifier and the quantity of the second assets, and the second expense condition corresponding to the second output account address.

In step S60423, the target node records the second input item and the second output item as the second transaction record in the new block of the current node in the blockchain network.

When recording the transaction information in a new block, the target node may record a transaction record corresponding to the transaction information shown in FIG. 9 in the new block, specifically, in the same transaction of the new block. The transaction includes the first transaction record and the second transaction record, and includes two inputs and two outputs. In a case that the user A exchanges 100 bitcoins for 50 ethers of the user B, the input source, the asset type, an asset quantity, and a proof of expense of the 100 bitcoins of the user A form the transaction input (the first input item) (the transaction input may alternatively not include the asset type and the asset quantity) of the first transaction record; and an outputted item number, an output account address, the asset type, the asset quantity, and an expense condition of the bitcoins of the user A form the transaction output (the first output item) of the first transaction record. Composition of the second transaction record is similar to that of the first transaction record. Therefore, details of the second transaction are not described herein again for the sake of brevity.

For the account addresses of the user A and the user B, the account address may be a wallet address. After downloading and installing a wallet client, a user may apply to create a wallet on the wallet client, and a server (which may be, for example, the transaction platform 13) corresponding to the client generates a private key, a public key, and a wallet address. In a process of generating the private key, the public key, and the wallet address, a private key is first generated by using a nonce generator, and a public key is generated by processing the private key through an algorithm. The algorithm may be the SECP256K1 algorithm. A public key can be obtained through an algorithm based on a known private key, but a private key cannot be reversely obtained through a known public key, to effectively ensure the security of the private key. A hash value of the public key may be obtained through calculation according to the public key. The wallet address is obtained through calculation according to the hash value of the public key. The foregoing server may be independent from nodes in a blockchain network. The process of generating a wallet address may also be operated by the client. The operation principle is similar to the above. Details are not described herein again. The private key and the public key are mathematically related. The public key is used for encrypting a piece of information or verifying a digital signature, and the private key is used for decrypting information and creating a digital signature. The private key cannot be reversely obtained through the public key, so that the public key can be made public without worrying about the security of the assets, and the private key needs to be kept safe. Assets transferred by another person are received by using the wallet address. The blockchain stores transfer records between various wallet addresses. The assets are not directly stored in the wallet address. If assets in a wallet address are intended, the assets need to be obtained through calculation according to the transfer records between the wallet addresses recorded in the blockchain. There is no asset in a wallet address obtained through a new application. Another user may transfer money to the wallet address according to the wallet address, for example, transfer 20 bitcoins to a wallet address A.

Transaction records between different types of assets are recorded in a blockchain by using the technical solutions provided in the embodiments of this application, so that a transaction between different types of assets may be implemented on a blockchain. In addition, a blockchain node obtains a transaction exchange rate between assets in a transaction, for example, obtains a transaction exchange rate between different types of assets stored on a blockchain, thereby determining a quantity of assets in the transaction according to the exchange rate, to improve transaction efficiency of different types of assets. Before a transaction record corresponding to the transaction information is stored in the blockchain, the transaction information is verified. All the nodes in the blockchain network verify the transaction information to ensure the security, validity and tamper-proofing of transaction records stored on the blockchain.

In exemplary embodiments of the present disclosure, the client may query the node in the blockchain network about assets in a corresponding wallet address. For example, the client, when logged in to each time, may query the node in the blockchain network about the assets in the wallet address, or periodically query the node in the blockchain network about the assets in the wallet address. Alternatively, the node in the blockchain network transmits the assets in the wallet address to the client in real time.

In exemplary embodiments of the present disclosure, a user may further communicate in a decentralized manner to reach a contract. For example, A exchanges 100 bitcoins for ethers of B, and a wallet client corresponding to the user A encrypts information "A exchanges 100 bitcoins for ethers" by using the public key of the user B (the public key of the user B is public), and transmits the encrypted information to any node in the blockchain network. Then, any node 14 broadcasts the encrypted information to other clients. Each client decrypts the foregoing information by using a private key of a corresponding user. When the decryption fails, it indicates that the information is not transmitted to the client. Therefore, only the user B can decrypt the foregoing information by using his/her own private key. After seeing the information, the user B may return the information to the user A in the foregoing same manner. A client corresponding to the user B may encrypt information "a quantity of ethers exchanged by B is 50" by using the public key of the user A, and transmit the encrypted information to a corresponding node. Then, the node broadcasts the encrypted information to other clients. Similarly, only the client of A may decrypt the foregoing information according to the private key of the user A. Therefore, a decentralized communication manner between the user A and the user B is implemented by using the blockchain.

In addition, during a transaction between users, the users may alternatively communicate in a centralized communication manner to reach a contract. For example, the communication may alternatively be performed by using the foregoing wallet client, or another communication client on a terminal device 11. For example, the user A exchanges 100 bitcoins for ethers of the user B. The user A and the user B may reach a contract by using a communication client (WeChat, QQ, or the like). For example, A and B reach a contract in which A exchanges 100 bitcoins for 50 ethers of B. After A and B reach a contract, a hash calculation is performed on information in the contract to obtain a hash value of transaction information. The user A and the user B respectively sign the hash value by using respective private keys, and then an initiator (the initiator may be the user A or the user B) transmits the transaction information to the node in the blockchain network.

After the contract is reached, for example, the user A and the user B reach the contract, when A exchanges 100 bitcoins for 50 ethers of the user B, the user A and the user B respectively sign contract information. Specifically, a hash calculation is performed on the information in the contract to obtain a hash value, and the user A and the user B respectively sign the hash value by using respective private keys. Transaction information is generated according to the signatures corresponding to the user A and the user B and the information in the contract. An initiator transmits the transaction information to the node in the blockchain network. The initiator may be the user A or the user B.

In exemplary embodiments, the target node may further determine one or more asset type identifiers under each account address, and an asset quantity under each asset type identifier according to the transaction information stored in the blockchain. As shown in FIG. 8, the determination includes the following steps.

In step S11, the target node receives an asset query request transmitted by a first client.

In step S12, the target node searches for, according to an account address carried in the asset query request, a transaction record corresponding to the account address in the blockchain.

In step S13, the target node determines one or more asset types corresponding to the account address and an asset quantity corresponding to each asset type according to the found transaction record.

In step S14, the target node transmits the one or more asset types corresponding to the account address and the asset quantity corresponding to the each asset type to the first client.

The transaction information about the first assets and the second assets is stored in the same blockchain by using the asset transaction method provided in this application. The type of the first assets and that of the second assets may be the same or different, so that based on the same blockchain, not only may a transaction between the same assets be implemented, but also a transaction between different asset types may be implemented.

Figure 10:
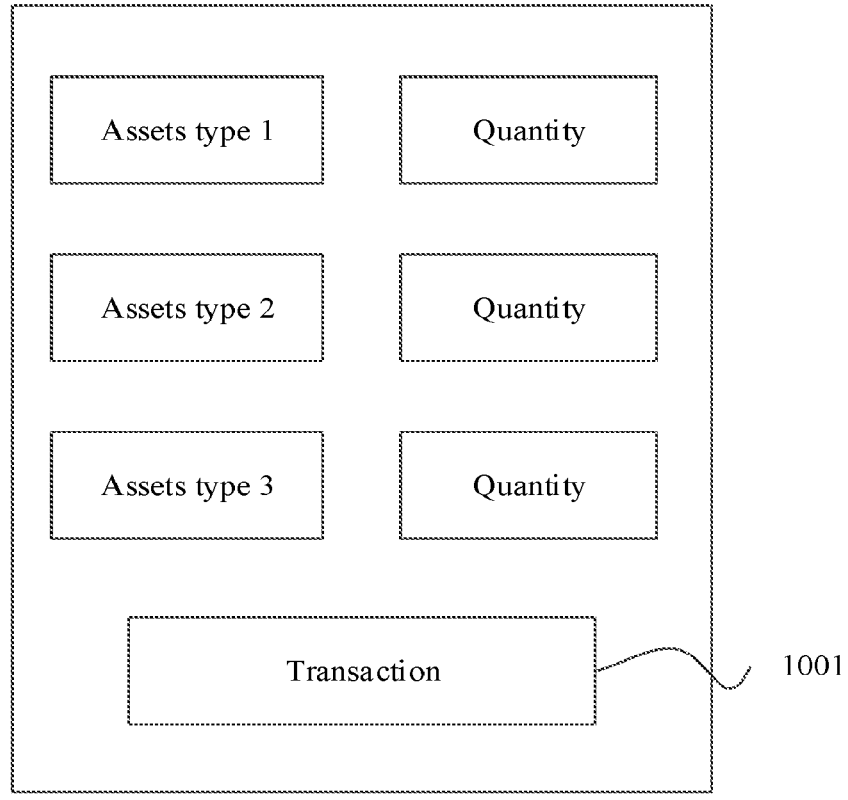
FIG. 10 is a schematic diagram of an asset display page according to exemplary embodiments of the present disclosure.

In exemplary embodiments of the present disclosure, the application client such as a wallet client, may directly query the node in the blockchain network about asset types under an account address, and an asset quantity under each asset type, or may query the target node by using an intermediate proxy server (for example, the transaction platform 13). Each asset type and an asset quantity under the each asset type obtained through query are displayed on the application client (for example, the wallet client). As shown in FIG. 10, there are three asset types and a quantity corresponding to each asset type displayed on an interface of a client. In addition, there is also a transaction control 1001 displayed on the interface. After a user taps the transaction control 1001, a transaction interface shown in FIG. 11 is displayed. The transaction interface includes an asset type and an asset quantity of transferred-out assets, and a wallet address of a payee, and further includes an asset type and an asset quantity of transferred-in assets and my wallet address. The user may enter transaction information on the transaction interface to initiate a transaction.

Figure 12:
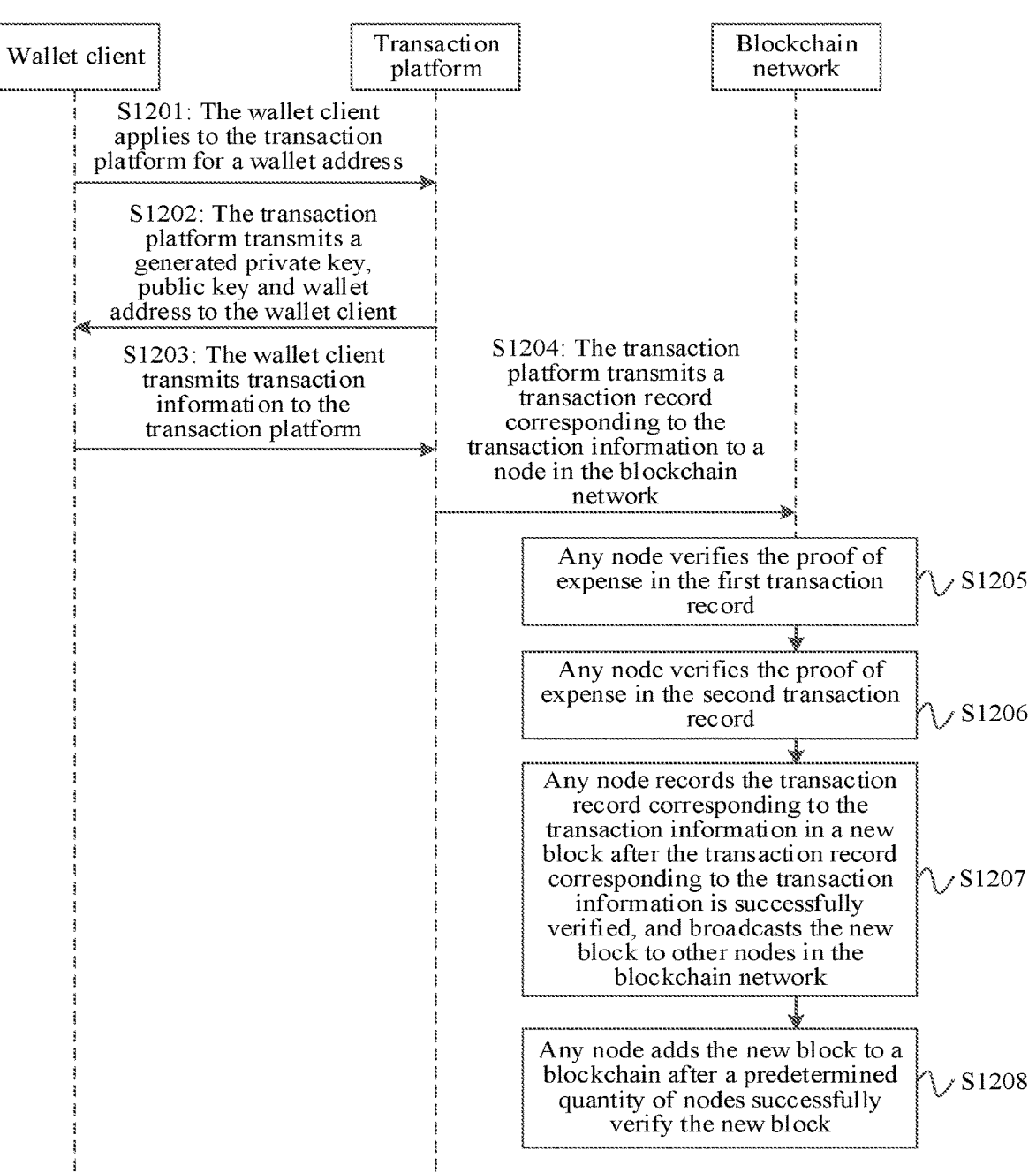
FIG. 12 is a diagram of message exchange of an asset transaction according to exemplary embodiments of the present disclosure.

A diagram of message exchange of an asset transaction method provided in this application is shown in FIG. 12. Description is made by using an example in which a transaction platform exists between an application client (a wallet client) and a blockchain network. The method includes the following steps.

In step S1201, the wallet client applies to the transaction platform for a wallet address.

In step S1202, the transaction platform transmits a generated private key, public key and wallet address to the wallet client.

Operations of generating the private key, public key, and wallet address may alternatively be performed by another server or the wallet client. Moreover, the transaction platform may transmit the generated public key to a node in the blockchain network, and then the node transmits the generated public key to other wallet clients to make the public key public.

In step S1203, the wallet client transmits transaction information to the transaction platform.

The transaction information includes a transaction input and a transaction output of a first transaction record, and a transaction input and a transaction output of a second transaction record.

The transaction input of the first transaction record includes an input source and a proof of expense of first assets. The transaction output of the first transaction record includes a type identifier, a quantity, and an output account address of the first assets, and an expense condition corresponding to the output account address.

The transaction input of the second transaction record includes an input source and a proof of expense of second assets. The transaction output of the second transaction record includes a type identifier, a quantity, and an output account address of the second assets, and an expense condition corresponding to the output account address.

Before the wallet client transmits the transaction information, two parties in a transaction may reach a contract in a centralized manner, or in a blockchain decentralization manner.

In step S1204, the transaction platform transmits a transaction record corresponding to the transaction information to a node in the blockchain network.

The transaction platform may parse the received transaction information, generate a transaction record in a blockchain system format, for example, the transaction record in the format shown in FIG. 9, and transmit the transaction record to any node in the blockchain network.

In step S1205, any node verifies the proof of expense in the first transaction record.

During the verification, a corresponding expense condition is searched for according to the input source in the first transaction record, and the proof of expense in the transaction input is verified according to the found expense condition.

In step S1206, any node verifies the proof of expense in the second transaction record.

A verification manner of the proof of expense in the second transaction record is similar to that of the proof of expense in the first transaction record. Details are not described herein again.

In step S1207, any node records the transaction record corresponding to the transaction information in a new block after the transaction record corresponding to the transaction information is successfully verified, and broadcasts the new block to other nodes in the blockchain network.

In step S1208, any node adds the new block to a blockchain after a predetermined quantity of nodes successfully verify the new block, for example, more than 51% nodes successfully verify the new block.

The asset transaction method provided in the embodiments of this application is described above. Transaction information about different types of assets may be recorded in a blockchain by using the solutions provided in this application, so that a transaction between different types of assets may be implemented on a blockchain.

Figure 13:
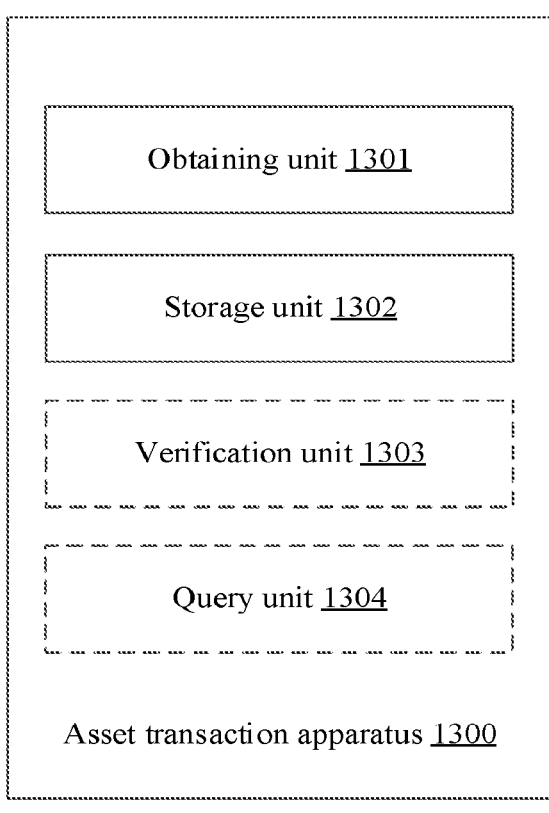
FIG. 13 is a schematic structural diagram of an asset transaction apparatus according to exemplary embodiments of the present disclosure.

The present disclosure further provides an asset transaction apparatus 1300. As shown in FIG. 13, the apparatus includes an obtaining unit 1301, a storage unit 1302, and may also include a verification unit 1303 and a query unit 1304. One or more of these units may be implemented by processing circuitry, for example.

The obtaining unit 1301 obtains transaction information. The transaction information includes a type identifier and a quantity of first assets for a transaction, and a type identifier and a quantity of second assets for the transaction.

The storage unit 1302 records, according to the transaction information after the transaction information is successfully verified, transaction records corresponding to the transaction in a new block of a current node in a blockchain network. The transaction records include at least a first transaction record and a second transaction record. The first transaction record includes a first input item and a first output item corresponding to the first assets, where the first input item and the first output item each includes the type identifier of the first assets. The second transaction record includes a second input item and a second output item corresponding to the second assets. The second input item and the second output item each includes the type identifier of the second assets. The obtaining unit 1301 broadcasts the new block to other nodes in the blockchain network, and receives verification results of the other nodes. The new block is then added to a blockchain of the current node according to the verification results.

In exemplary embodiments, the obtaining unit 1301 receives a first transaction request, and obtains the type identifier and the quantity of the first assets and the type identifier and the quantity of the second assets from the first transaction request.

In exemplary embodiments, the obtaining unit 1301 receives a second transaction request, and obtains the type identifier of the first assets, the quantity of the first assets, and the type identifier of the second assets from the second transaction request. The obtaining unit 1301 also obtains a transaction exchange rate between the first assets and the second assets according to the type identifier of the first assets and the type identifier of the second assets, and determines the quantity of the second assets according to the quantity of the first assets and the transaction exchange rate.

In exemplary embodiments, the transaction information further includes a source of the first assets, a proof of expense of the first assets, a first output account address corresponding to the first assets, a first expense condition corresponding to the first output account address, a source of the second assets, a proof of expense of the second assets, a second output account address corresponding to the second assets, a second expense condition corresponding to the second output account address.

The storage unit 1302 records the first transaction record in the new block of the current node in the blockchain network according to the source of the first assets, the proof of expense of the first assets, the first output account address corresponding to the first assets, and the first expense condition corresponding to the first output account address. The storage unit 1302 also records the second transaction record in the new block of the current node in the blockchain network according to the source of the second assets, the proof of expense of the second assets, the second output account address corresponding to the second assets, and the second expense condition corresponding to the second output account address.

In exemplary embodiments, the storage unit 1302 determines determine the first input item according to the source of the first assets and the proof of expense of the first assets. The storage unit 1302 also determines the first output item according to the first output account address corresponding to the first assets, the type identifier and the quantity of the first assets, and the first expense condition corresponding to the first output account address. The storage unit 1302 records the first input item and the first output item as the first transaction record in the new block of the current node in the blockchain network, and determines the second input item according to the source of the second assets and the proof of expense of the second assets. The storage unit 1302 further determines the second output item according to the second output account address corresponding to the second assets, the type identifier and the quantity of the second assets, and the second expense condition corresponding to the second output account address, and records the second input item and the second output item as the second transaction record in the new block of the current node in the blockchain network.

In exemplary embodiments the verification unit 1303 verifies the first assets according to the source of the first assets and the proof of expense of the first assets, and verifies the second assets according to the source of the second assets and the proof of expense of the second assets. The verification unit 1303 then determines that the transaction information is successfully verified in a case that the first assets and the second assets are both successfully verified.

In exemplary embodiments, the verification unit 1303 searches for the expense condition of the first assets according to the source of the first assets, verifies the first assets according to the expense condition of the first assets and the proof of expense of the first assets, searches for an expense condition of the second assets according to the source of the second assets, and verifies the second assets according to the expense condition of the second assets and the proof of expense of the second assets In exemplary embodiments, the proof of expense of the first assets includes a first signature determined according to a private key corresponding to the first assets, the proof of expense of the second assets includes a second signature determined according to a private key corresponding to the second assets, an expense condition of the first assets includes a first public key corresponding to the first assets, and an expense condition of the second assets includes a second public key corresponding to the second assets.

The verification unit 1303 verifies the first signature according to the first public key, and verifies the second signature according to the second public key.

In exemplary embodiments, the proof of expense of the first assets includes the first signature determined according to the private key corresponding to the first assets and the first public key corresponding to the first assets, the proof of expense of the second assets includes the second signature determined according to the private key corresponding to the second assets and the second public key corresponding to the second assets, the expense condition of the first assets includes a public key hash value corresponding to the first assets, and the expense condition of the second assets includes a public key hash value corresponding to the second assets.

The verification unit 1303 verifies the first public key hash value according to the first public key, verifies the first signature according to the first public key after the verification succeeds, verifies the second public key hash value according to the second public key, and verifies the second signature according to the second public key after the verification succeeds.

In exemplary embodiments, the verification unit 1303 adds the new block to the blockchain of the current node in a case that a quantity of verification results of successful verification in received verification results meets a preset condition.

In exemplary embodiments the query unit 1304 receives an asset query request transmitted by a first client, and searches for a transaction record corresponding to the account address in the blockchain according to an account address carried in the asset query request. The query unit 1304 also determines one or more asset types corresponding to the account address and an asset quantity corresponding to each asset type according to the found transaction record, and transmits the one or more asset types corresponding to the account address and the asset quantity corresponding to the each asset type to the first client.

In addition, functional units in the exemplary embodiments of the present disclosure may be integrated into one processing unit (i.e., processing circuit), or each of the units may exist alone physically as stand-alone circuits, or two or more modules may be integrated into one unit (i.e., into one circuit). The integrated unit may be implemented in the form of hardware circuitry, or may be implemented in a form of software executed on hardware circuitry. The functional units in the exemplary embodiments may be located in one terminal or network node, or may be distributed on a plurality of terminals or network nodes.

The present disclosure further provides a non-transitory computer-readable storage medium, storing computer-readable instructions, where the computer-readable instructions cause at least one processing circuit to perform the exemplary methods described herein.

In exemplary embodiments, the asset transaction apparatus may be run on various computing devices, and loaded in memories of the computing devices.

Figure 14:
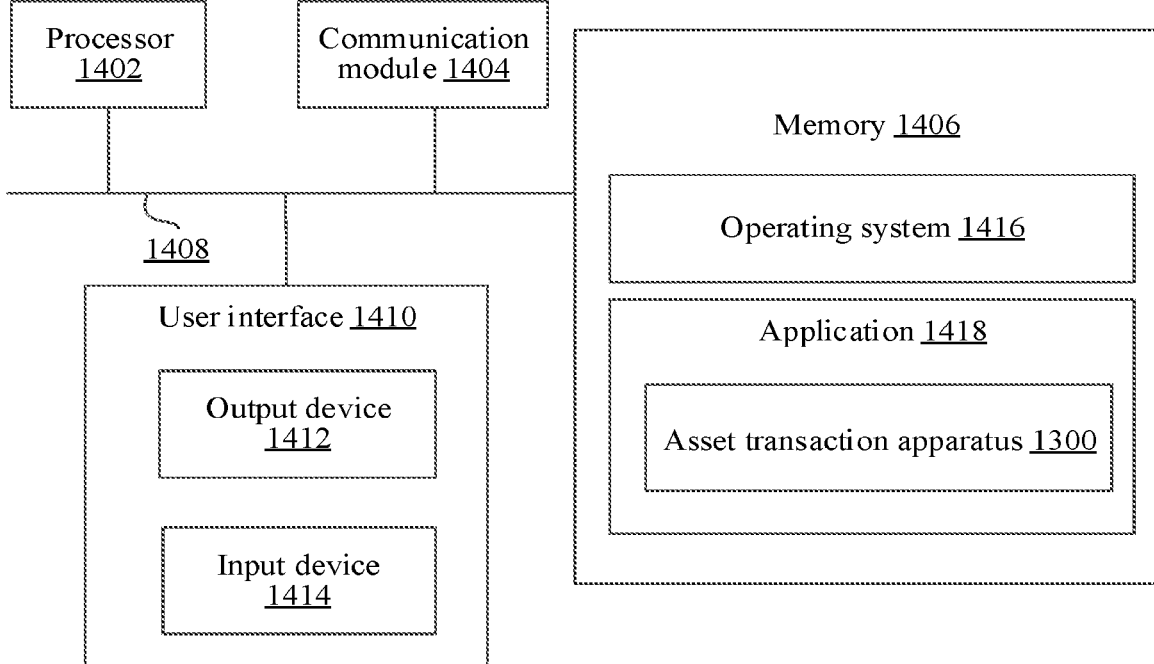
FIG. 14 is a schematic structural diagram of composition of a computing device according to exemplary embodiments of the present disclosure.

FIG. 14 is a structural composition diagram of a computing device in which an asset transaction apparatus is located. As shown in FIG. 14, the computing device includes circuitry such as one or more processors (CPU) 1402, a communication module 1404, a memory 1406, a user interface 1410, and a communication bus 1408 configured to interconnect the components.

The processor 1402 may receive and send data by using the communication module 1404, to implement network communication and/or local communication.

The user interface 1410 includes one or more output devices 1412, including one or more speakers and/or one or more visual displays. The user interface 1410 further includes one or more input devices 1414, including a keyboard, a mouse, a sound command input unit or a microphone, a touch display, a touch-sensitive input panel, a posture capturing camera, another input button or control, or the like.

The memory 1406 may be a high-speed random access memory such as a DRAM, a SRAM, a DDR RAM, or another random access solid-state storage device; or a non-volatile memory such as one or more magnetic storage devices, an optical disc storage device, a flash memory, or another non-volatile solid-state storage device.

The memory 1406 stores an instruction set that can be performed by the memory 1402, including an operating system 1416, including a program configured to process various basic system services and execute a hardware-related task, and an application 1418, including various application programs that may implement the processing procedures in the embodiments, for example, may include the apparatus 1300 shown in FIG. 13. In some embodiments, the apparatus 1300 may include some or all of the modules 1301 to 1304 shown in FIG. 13, and the modules 1301 to 1304 may store computer-executable instructions. The processor 1402 may perform functions of the modules 1301 to 1304 by executing the machine-executable instructions in the modules 1301 to 1304 in the memory 1406.

As one of ordinary skill will recognize, not all of the steps and modules in the processes and structural diagrams are mandatory, and particular steps or modules may be omitted according to an actual requirement. An execution sequence of the steps is not fixed and may be adjusted according to an actual requirement. Division of the modules is merely functional division for ease of description. During actual implementation, one module may be implemented separately by a plurality of modules, and functions of the plurality of modules may alternatively be implemented by the same module. The modules may be located in the same device, and may also be located in different devices.

A unit or a hardware module in each embodiment may be implemented in a hardware circuit or in a hardware platform combining a hardware circuit with software that executes thereon. The software includes a machine-readable instruction, stored in a non-transitory non-volatile storage medium. Therefore, the exemplary embodiments may alternatively be implemented in the form of a non-transitory computer-readable medium that stores computer-readable instructions.

In the exemplary embodiments of the present disclosure, hardware may be implemented by dedicated hardware circuitry or hardware circuitry executing the machine-readable instruction. For example, the hardware may be a specifically designed permanent circuit or logical device (for example, a dedicated processor, such as an FPGA or an ASIC) configured to complete a specific operation. The hardware may alternatively include a programmable logical device or circuit (for example, including a general processor or another programmable processor) configured temporarily by software and configured to perform a specific operation.

In addition, the exemplary embodiments of this application may be implemented by a data processing program executed by a data processing device such as a computer. Apparently, the data processing program includes instructions corresponding to the exemplary methods described herein. In addition, generally the data processing program stored in a non-transitory storage medium is executed by directly reading the program from the storage medium or by installing or copying the program to a storage device (such as a hard disk or an internal memory) of the data processing device. The present disclosure further provides a non-volatile the storage medium storing a data processing program. The data processing program may be used for perform any exemplary embodiment described herein.

A non-transitory non-volatile computer-readable storage medium may be a memory inserted into an expansion board in the computer or a memory written to an expansion unit connected to the computer. A CPU or the like installed on the expansion board or the expansion unit may perform some and all actual operations according to an instruction.

The non-transitory non-volatile computer-readable storage medium includes a floppy disk, a hard disk, a magneto-optical disk, an optical memory (for example, a CD-ROM, a CD-R, a CD-RW, a DVD-ROM, a DVD-RAM, a DVD-RW, or a DVD+RW), a magnetic tape, a non-volatile storage card, and a ROM. Optionally, program code may be downloaded from a server computer by using a communication network.

The foregoing descriptions are merely exemplary embodiments of the present disclosure, and therefore are not limiting. Any modification, equivalent replacement, improvement, or the like made without departing from the spirit and principle of this application also falls within the protection scope of the present disclosure.

What is claimed is:

1. An asset transaction method for implementing a transaction of cryptocurrencies of different types on a single blockchain, comprising:

receiving, by circuitry of a current node of a blockchain network, a first transaction request that includes a first type identifier and a first quantity of first cryptocurrency;

receiving, by the circuitry of the current node, a second transaction request that includes a second type identifier of second cryptocurrency, the first type identifier and the second type identifier being different numbers that identify different asset types such that the transaction involves exchange of the cryptocurrencies of different types that include the first cryptocurrency and the second cryptocurrency;

obtaining, by the circuitry of the current node, a transaction exchange rate between the first cryptocurrency and the second cryptocurrency according to the first type identifier of the first cryptocurrency and the second type identifier of the second cryptocurrency;

determining a second quantity of the second cryptocurrency based on the first quantity of the first cryptocurrency and the transaction exchange rate;

verifying, by the circuitry of the current node, transaction information of the transaction, the transaction information including at least the first type identifier, the first quantity of the first cryptocurrency, the second type identifier, and the second quantity of the second cryptocurrency;

recording, by the circuitry of the current node and after the transaction information is successfully verified, transaction record information corresponding to the transaction involving the cryptocurrencies of different types in a new block of the current node of the blockchain network, the transaction record information indicating at least a first transaction record and a second transaction record, the first transaction record including a first input item and a first output item corresponding to the first cryptocurrency, and the second transaction record including a second input item and a second output item corresponding to the second cryptocurrency broadcasting, by the circuitry of the current node, the new block to other nodes in the blockchain network;

receiving, by the circuitry of the current node, verification results of the other nodes; and adding the new block to the single blockchain of the current node according to the verification results, wherein the single blockchain is configured to store a plurality of blocks of different transactions of the cryptocurrencies of the different types;

the new block added to the single blockchain includes:

a timestamp indicative of a time when the new block is created, transaction exchange rate information indicating the transaction exchange rate, the transaction record information indicating the first transaction record and the second transaction record, and a unique identifier generated based on a hash calculation of at least a combination of the first transaction record and the second transaction record in the transaction record information;

the first input item includes a first source of the first cryptocurrency, the first type identifier of the first cryptocurrency, the first quantity of the first cryptocurrency, and a proof of expense of the first cryptocurrency that includes a first signature generated with a first private key;

the second input item includes a second source of the second cryptocurrency, the second type identifier of the second cryptocurrency, the second quantity of the second cryptocurrency, and a proof of expense of the second cryptocurrency that includes a second signature generated with a second private key;

the first output item includes a first output account address corresponding to the first cryptocurrency, the first type identifier of the first cryptocurrency, the first quantity of the first cryptocurrency, and a first expense condition of the first cryptocurrency that includes first public key information; and the second output item includes a second output account address corresponding to the second cryptocurrency, the second type identifier of the second cryptocurrency, the second quantity of the second cryptocurrency, and a second expense condition of the second cryptocurrency that includes second public key information.

2. The method according to claim 1, wherein the recording the transaction record information comprises:

determining the first input item according to the first source of the first cryptocurrency and the proof of expense of the first cryptocurrency;

determining the first output item according to the first output account address corresponding to the first cryptocurrency, the first type identifier and the first quantity of the first cryptocurrency, and the first expense condition corresponding to the first output account address;

recording the first input item and the first output item as the first transaction record in the new block of the current node in the blockchain network;

determining the second input item according to the second source of the second cryptocurrency and the proof of expense of the second cryptocurrency;

determining the second output item according to the second output account address corresponding to the second cryptocurrency, the second type identifier and the second quantity of the second cryptocurrency, and the second expense condition corresponding to the second output account address; and recording the second input item and the second output item as the second transaction record in the new block of the current node in the blockchain network.

3. The method according to claim 1, wherein the verifying the transaction information of the transaction comprises:

verifying the first cryptocurrency according to the first source of the first cryptocurrency and the proof of expense of the first cryptocurrency;

verifying the second cryptocurrency according to the second source of the second cryptocurrency and the proof of expense of the second cryptocurrency; and determining that the transaction information is successfully verified in a case that the first cryptocurrency and the second cryptocurrency are both successfully verified.

4. The method according to claim 3, wherein the verifying the first cryptocurrency includes:

searching for the first expense condition of the first cryptocurrency according to the first source of the first cryptocurrency; and verifying the first cryptocurrency according to the first expense condition of the first cryptocurrency and the proof of expense of the first cryptocurrency; and the verifying the second cryptocurrency includes:

searching for the second expense condition of the second cryptocurrency according to the second source of the second cryptocurrency; and verifying the second cryptocurrency according to the second expense condition of the second cryptocurrency and the proof of expense of the second cryptocurrency.

5. The method according to claim 4, wherein the verifying the first cryptocurrency includes:

verifying the first signature according to the first public key information; and the verifying the second cryptocurrency includes:

verifying the second signature according to the second public key information.

6. The method according to claim 1, wherein the transaction exchange rate is obtained from contract information associated with two parties of the transaction, or a third-party server device.

7. A processing apparatus of a current node of a blockchain network for implementing a transaction of cryptocurrencies of different types on a single blockchain, comprising:

circuitry configured to:

receive a first transaction request that includes a first type identifier and a first quantity of first cryptocurrency;

receive a second transaction request that includes a second type identifier of second cryptocurrency, the first type identifier and the second type identifier being different numbers that identify different asset types such that the transaction involves exchange of the cryptocurrencies of different types that include the first cryptocurrency and the second cryptocurrency;

obtain a transaction exchange rate between the first cryptocurrency and the second cryptocurrency according to the first type identifier of the first cryptocurrency and the second type identifier of the second cryptocurrency;

determine a second quantity of the second cryptocurrency based on the first quantity of the first cryptocurrency and the transaction exchange rate;

verify transaction information of the transaction, the transaction information including at least the first type identifier, the first quantity of the first cryptocurrency, the second type identifier, and the second quantity of the second cryptocurrency;

record, after the transaction information is successfully verified, transaction record information corresponding to the transaction involving the cryptocurrencies of different types in a new block of the current node of the blockchain network, the transaction record information indicating at least a first transaction record and a second transaction record, the first transaction record including a first input item and a first output item corresponding to the first cryptocurrency, and the second transaction record including a second input item and a second output item corresponding to the second cryptocurrency;

broadcast the new block to other nodes in the blockchain network;

receive verification results of the other nodes; and add the new block to the single blockchain of the current node according to the verification results, wherein the single blockchain is configured to store a plurality of blocks of different transactions of the cryptocurrencies of the different types; and the new block added to the single blockchain includes:

a timestamp indicative of a time when the new block is created, transaction exchange rate information indicating the transaction exchange rate, the transaction record information indicating the first transaction record and the second transaction record, and a unique identifier generated based on a hash calculation of at least a combination of the first transaction record and the second transaction record in the transaction record information;

the first input item includes a first source of the first cryptocurrency, the first type identifier of the first cryptocurrency, the first quantity of the first cryptocurrency, and a proof of expense of the first cryptocurrency that includes a first signature generated with a first private key;

the second input item includes a second source of the second cryptocurrency, the second type identifier of the second cryptocurrency, the second quantity of the second cryptocurrency, and a proof of expense of the second cryptocurrency that includes a second signature generated with a second private key;

the first output item includes a first output account address corresponding to the first cryptocurrency, the first type identifier of the first cryptocurrency, the first quantity of the first cryptocurrency, and a first expense condition of the first cryptocurrency that includes first public key information; and the second output item includes a second output account address corresponding to the second cryptocurrency, the second type identifier of the second cryptocurrency, the second quantity of the second cryptocurrency, and a second expense condition of the second cryptocurrency that includes second public key information.

8. The processing apparatus according to claim 7, wherein the circuitry is configured to:

determine the first input item according to the first source of the first cryptocurrency and the proof of expense of the first cryptocurrency;

determine the first output item according to the first output account address corresponding to the first cryptocurrency, the first type identifier and the first quantity of the first cryptocurrency, and the first expense condition corresponding to the first output account address;

record the first input item and the first output item as the first transaction record in the new block of the current node in the blockchain network;

determine the second input item according to the second source of the second cryptocurrency and the proof of expense of the second cryptocurrency;

determine the second output item according to the second output account address corresponding to the second cryptocurrency, the second type identifier and the second quantity of the second cryptocurrency, and the second expense condition corresponding to the second output account address; and record the second input item and the second output item as the second transaction record in the new block of the current node in the blockchain network.

9. The processing apparatus according to claim 7, wherein the circuitry is configured to:

verify the first cryptocurrency according to the first source of the first cryptocurrency and the proof of expense of the first cryptocurrency;

verify the second cryptocurrency according to the second source of the second cryptocurrency and the proof of expense of the second cryptocurrency; and determine that the transaction information is successfully verified in a case that the first cryptocurrency and the second cryptocurrency are both successfully verified.

10. The processing apparatus according to claim 9, wherein the circuitry is configured to:

search for the first expense condition of the first cryptocurrency according to the first source of the first cryptocurrency;

verify the first cryptocurrency according to the first expense condition of the first cryptocurrency and the proof of expense of the first cryptocurrency;

search for the second expense condition of the second cryptocurrency according to the second source of the second cryptocurrency; and verify the second cryptocurrency according to the second expense condition of the second cryptocurrency and the proof of expense of the second cryptocurrency.

11. The processing apparatus according to claim 10, wherein the first cryptocurrency is verified based on verification of the first signature according to the first public key information; and the second cryptocurrency is verified based on verification of the second signature according to the second public key information.

12. The processing apparatus according to claim 7, wherein the transaction exchange rate is obtained from contract information associated with two parties of the transaction, or a third-party server device.

13. A non-transitory computer-readable storage medium for implementing a transaction of cryptocurrencies of different types on a single blockchain, storing computer-readable instructions thereon, the computer-readable instructions, when executed by processing circuitry of a current node of a blockchain network, cause the processing circuitry to perform:

receiving a first transaction request that includes a first type identifier and a first quantity of first cryptocurrency;

receiving a second transaction request that includes a second type identifier of second cryptocurrency, the first type identifier and the second type identifier being different numbers that identify different asset types such that the transaction involves exchange of the cryptocurrencies of different types that include the first cryptocurrency and the second cryptocurrency;

obtaining a transaction exchange rate between the first cryptocurrency and the second cryptocurrency according to the first type identifier of the first cryptocurrency and the second type identifier of the second cryptocurrency;

determining a second quantity of the second cryptocurrency based on the first quantity of the first cryptocurrency and the transaction exchange rate;

verifying transaction information of the transaction, the transaction information including at least the first type identifier, the first quantity of the first cryptocurrency, the second type identifier, and the second quantity of the second cryptocurrency;

recording, after the transaction information is successfully verified, transaction record information corresponding to the transaction involving the cryptocurrencies of different types in a new block of the current node of the blockchain network, the transaction record information indicating at least a first transaction record and a second transaction record, the first transaction record including a first input item and a first output item corresponding to the first cryptocurrency, and the second transaction record including a second input item and a second output item corresponding to the second cryptocurrency;

broadcasting the new block to other nodes in the blockchain network;

receiving verification results of the other nodes; and adding the new block to the single blockchain of the current node according to the verification results, wherein the single blockchain is configured to store a plurality of blocks of different transactions of the cryptocurrencies of the different types;

the new block added to the single blockchain includes:

a timestamp indicative of a time when the new block is created, transaction exchange rate information indicating the transaction exchange rate, the transaction record information indicating the first transaction record and the second transaction record, and a unique identifier generated based on a hash calculation of at least a combination of the first transaction record and the second transaction record in the transaction record information;

the first input item includes a first source of the first cryptocurrency, the first type identifier of the first cryptocurrency, the first quantity of the first cryptocurrency, and a proof of expense of the first cryptocurrency that includes a first signature generated with a first private key;

the second input item includes a second source of the second cryptocurrency, the second type identifier of the second cryptocurrency, the second quantity of the second cryptocurrency, and a proof of expense of the second cryptocurrency that includes a second signature generated with a second private key;

the first output item includes a first output account address corresponding to the first cryptocurrency, the first type identifier of the first cryptocurrency, the first quantity of the first cryptocurrency, and a first expense condition of the first cryptocurrency that includes first public key information; and the second output item includes a second output account address corresponding to the second cryptocurrency, the second type identifier of the second cryptocurrency, the second quantity of the second cryptocurrency, and a second expense condition of the second cryptocurrency that includes second public key information.

14. The non-transitory computer-readable storage medium according to claim 13, wherein the computer-readable instructions, when executed by the processing circuitry, further cause the processing circuitry to perform:

determining the first input item according to the first source of the first cryptocurrency and the proof of expense of the first cryptocurrency;

determining the first output item according to the first output account address corresponding to the first cryptocurrency, the first type identifier and the first quantity of the first cryptocurrency, and the first expense condition corresponding to the first output account address;

recording the first input item and the first output item as the first transaction record in the new block of the current node in the blockchain network;

determining the second input item according to the second source of the second cryptocurrency and the proof of expense of the second cryptocurrency;

determining the second output item according to the second output account address corresponding to the second cryptocurrency, the second type identifier and the second quantity of the second cryptocurrency, and the second expense condition corresponding to the second output account address; and recording the second input item and the second output item as the second transaction record in the new block of the current node in the blockchain network.

15. The non-transitory computer-readable storage medium according to claim 13, wherein the computer-readable instructions, when executed by the processing circuitry, cause the processing circuitry to perform:

verifying the first cryptocurrency according to the first source of the first cryptocurrency and the proof of expense of the first cryptocurrency;

verifying the second cryptocurrency according to the second source of the second cryptocurrency and the proof of expense of the second cryptocurrency; and determining that the transaction information is successfully verified in a case that the first cryptocurrency and the second cryptocurrency are both successfully verified.

16. The non-transitory computer-readable storage medium according to claim 15, wherein the computer-readable instructions, when executed by the processing circuitry, cause the processing circuitry to perform:

searching for the first expense condition of the first cryptocurrency according to the first source of the first cryptocurrency;

verifying the first cryptocurrency according to the first expense condition of the first cryptocurrency and the proof of expense of the first cryptocurrency;

searching for the second expense condition of the second cryptocurrency according to the second source of the second cryptocurrency; and verifying the second cryptocurrency according to the second expense condition of the second cryptocurrency and the proof of expense of the second cryptocurrency.

17. The non-transitory computer-readable storage medium according to claim 16, wherein the verifying the first cryptocurrency includes:

verifying the first signature according to the first public key information; and the verifying the second cryptocurrency includes:

verifying the second signature according to the second public key information.

18. The non-transitory computer-readable storage medium according to claim 13, wherein the transaction exchange rate is obtained from contract information associated with two parties of the transaction, or a third-party server device.

\*    \*    \*    \*    \*